US006522333B1

(12) United States Patent
Hatlelid et al.

(10) Patent No.: US 6,522,333 B1
(45) Date of Patent: Feb. 18, 2003

(54) REMOTE COMMUNICATION THROUGH VISUAL REPRESENTATIONS

(75) Inventors: Kris E. Hatlelid, Coquitlam (CA); William D. Harrison, North Vancouver (CA); Ken G. Kavanagh, Port Coquitlam (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 09/415,769

(22) Filed: Oct. 8, 1999

(51) Int. Cl.[7] .................................................. G06T 15/70
(52) U.S. Cl. ........................................ 345/474; 345/473
(58) Field of Search ................................ 345/473, 474, 345/769

(56) References Cited

U.S. PATENT DOCUMENTS

| | | | | |
|---|---|---|---|---|
| 5,261,041 A | | 11/1993 | Susman | 395/152 |
| 5,347,306 A | | 9/1994 | Nitta | 348/15 |
| 5,867,175 A | | 2/1999 | Katzenberger et al. | 345/473 |
| 5,977,965 A | | 11/1999 | Davis, III et al. | 345/328 |
| 5,986,675 A | * | 11/1999 | Anderson et al. | 345/473 |
| 6,031,549 A | | 2/2000 | Hayes-Roth | 345/474 |
| 6,112,177 A | | 8/2000 | Cosatto et al. | 704/260 |
| 6,115,040 A | | 9/2000 | Bladow et al. | 345/335 |
| 6,141,019 A | | 10/2000 | Roseborough et al. | 345/473 |
| 6,229,533 B1 | * | 5/2001 | Farmer et al. | 345/473 |
| 6,297,830 B1 | * | 10/2001 | Hoddie et al. | 345/473 |

* cited by examiner

*Primary Examiner*—Mark Zimmerman
*Assistant Examiner*—Lance W. Sealey
(74) *Attorney, Agent, or Firm*—Townsend and Townsend and Crew LLP; Gerald T. Gray

(57) ABSTRACT

A system and method for remote communication is disclosed that allows communication over a network but still provides a behavioral context within which the communication is interpreted. A visual representation of a user is provided to a recipient. A set of behavioral characteristics of the visual representation is provided to the user, the behavioral characteristics representing contexts within which data is to be interpreted. The user selects a behavioral characteristic and inputs data to be communicated to the recipient, along with any specific behavioral commands. Then, data is communicated to the recipient concurrently with a behavioral movement of the visual representation associated with the selected behavioral characteristic, wherein the behavioral movement provides context to the recipient for interpreting the communicated data. Behavioral characteristics include personality and mood intensity settings, and behavioral commands include gesture commands. The mood intensity selection allows the user to adjust which behavioral movements associated with the personality will be selected by assigning each movement a weight that determines the probability the movement will be selected. Gesture selection allows the user to punctuate text by having the visual representation act out a specific behavioral movement or sequence of movements to communicate an instantaneous emotion or behavior. Text is also analyzed to generate behavioral movements based on the content of the text.

56 Claims, 29 Drawing Sheets

| | | | | | | | | |
|---|---|---|---|---|---|---|---|---|
| TEXT 1454 | FACIAL ANIMATION ID 1458 | SPEED OF FACIAL ANIMATION PLAYBACK 1462 | ITERATIONS OF FACIAL ANIMATION PLAYBACK 1466 | BODY ANIMATION ID 1470 | SPEED OF BODY ANIMATION PLAYBACK 1474 | INTERATIONS OF BODY ANIMATION PLAYBACK 1478 | DURATION 1482 | LINK 1486 |

REMOTE COMMUNICATION THROUGH VISUAL REPRESENTATIONS

TECHNICAL FIELD

The present invention relates generally to the field of telecommunication, more particularly to the field of telecommunications in which graphical user icons are used for communication.

BACKGROUND OF THE INVENTION

Electronic mail is rapidly becoming the most preferred method of remote communication. Millions of people send e-mails to friends, family, and business associates in place of telephone calls, letters, and traveling to be physically present with the other party. This method of communication is popular, and among many people is the preferred method of communication. However, electronic mail lacks the personal feeling that users receive through an actual face-to-face meeting or, to a lesser extent, a telephone call. Face-to-face meetings and telephone calls are superior and more rewarding methods of communication because in these mediums, behavioral information such as emotions, facial expressions and body language are quickly and easily expressed, providing valuable context within which communications can be interpreted. In e-mail, communication is stripped of emotional or behavioral clues, and the dry text is often misinterpreted because of this absence of emotional or behavioral information. For example, if a sender types, in an e-mail, "I think it may be a good idea", the interpretation by the recipient is ambiguous. If the recipient could see the sender smile, then the recipient would know the sender is positive about the idea. If the recipient could see a doubtful expression (a raised eyebrow, for example) on the sender's face, the recipient would understand that the sender is unsure whether the idea is good or not. This type of valuable behavior information about a person's state is communicated in face-to-face communication. Other types of emotional information are also communicated in face-to-face meetings. If a person is generally cheery, then this fact is communicated through the person's behavior; it is apparent from the facial and body movements of the individual. If a generally cheery person is depressed, this emotion is also apparent through facial and body movements and will provoke an inquiry from the opposite party. However, in an e-mail environment, these types of clues are difficult to convey. One weak remedy to this problem is the rise of "emoticons"—combinations of letters and punctuation marks that happen to vaguely resemble or are deemed to mean, emotional states such as the now common smile ";-)".

Telephonic communication provides an advance over e-mail because it also provides audio clues in the speaker's tone of voice which allow a listener to quickly determine, for example, whether a statement was intended to be taken seriously or as a joke. However, telephonic communication provides no visual clues to aid a user in understanding communications, and thus, a listener is often left to guess at what an opposite party is truly intending to convey.

Therefore, a system is needed which is compatible with the e-mail system that millions of users are accustomed to using for communication but which can also provide valuable emotional and behavioral information to the recipient to interpret the communication in context.

SUMMARY OF INVENTION

The present invention is a system and method for remote communication that allows communication over a network, such as the internet, but still provides behavioral information providing a context within which the communication can be interpreted. Accordingly, a visual representation of a user is provided to a recipient. A set of behavioral characteristics of the visual representation is provided to the user, the behavioral characteristics representing emotional contexts within which data is to be interpreted by the recipient of the communication. Next, the user selects a behavioral characteristic and inputs data to be communicated to the recipient, along with any optional specific behavioral commands. Behavioral characteristics are associated with behavioral movements to be animated by the visual representations. Then, data is communicated to the recipient concurrently with behavioral movement information associated with the selected behavioral characteristic, where the behavioral movement information causes the visual representation of the sender to animate facial and body movements that communicate the selected behavioral characteristics, thus providing the emotional context to the recipient for interpreting the communicated data. For example, if the user has selected extroverted behavioral characteristics, and types a phrase such as "Hello," the present invention analyzes the phrase and animates the visual representation with behavioral movements responsive to the selection of the extroverted behavioral characteristic, for example, animating the visual representation to say "Hello" with a big wave and a smile. Thus, the recipient receives the data and views the visual representation with its applied behavioral movements and immediately understands that the sender is an extrovert or is in a good mood. In another example, if the sender sends a statement "I should fire you" with a smile and a wink the recipient knows the statement is in jest. Passionate commitment to an idea can be communicated through the display of extravagant gestures, and positive feelings about a recipient can be communicated through a smile.

In a preferred embodiment, behavioral movements are generated responsive to natural language processing of the text, by recognizing that certain words in text can be grouped into categories. Predefined categories to be used for natural language processing include ejectives, prepositions, volumetrics, count nouns, egocentricity, xenocentricity, negatives, positives, referents, interrogatories, and specifics. The categories are then linked to behavioral movements that express a behavior responsive to the user's behavioral characteristic selection. For example, if an ejective is used, such as "ow!", a hurt expression is generated for the sender's visual representation. The specific Is expression is selected responsive to the selected behavioral characteristics, due to weightings imparted on the behavioral movements by the selection of the behavioral characteristics. For example, if a comedian personality is selected by the sender, the 'ow' is accompanied by exaggerated facial movements and dancing around as if in pain, or clutching at his or her heart; these movements having been assigned a higher weight because of the selection of the comedian personality. In another embodiment, natural language processing includes recognition of predefined phrases in the text communicated by the sender. The phrases are linked to one of the predefined categories, and the behavioral movements associated with the category can be used upon recognition of the predefined phrase. Thus, the present invention restores the ability to communicate essential emotional and behavioral information in a remote communication, providing a more natural and complete communication interface between users.

In accordance with one preferred embodiment of the present invention, behavioral characteristics include personality and mood intensity settings, and behavioral commands include gesture commands. In this embodiment, the user selects a personality type for the visual representation to express a specific emotion or image. The personality or image can correspond to the user's actual personality or image, or can be any personality or image the user chooses to adopt for the conversation session. During a conversation, the visual representation is animated with behavioral movements linked to the selected personality. For example, an extrovert personality selection will generate behavioral movements which are dynamic and energetic, such as moving frequently, having eyes wide open, and making big hand gestures, whereas an introvert personality will have movements which are subdued, e.g., little or no body or facial movements. By animating these movements in connection with the text, the visual representation communicates the personality desired to be communicated by the sender, which is important emotional information otherwise absent from an electronic communication.

The mood intensity selection allows the user to adjust which behavioral movements associated with the personality type will be selected. The selection of a mood intensity assigns each movement a weight that determines the probability the movement will be selected. For example, if a cheerful mood is selected, then behavioral movements which are associated with more pleasant emotions, e.g. laughing, are given higher weight, and are therefore selected with higher frequency. This provides greater control over the behavioral movements of a visual representation to allow more precise communication of a sender's emotional state. Gestures are also provided to allow the user to emphasize text or emotions by having the visual representation animate a specific behavioral movement or sequence of movements to communicate an instantaneous emotion or behavior, for example, shaking a fist to communicate anger, or waving a hand to signal a welcome.

In one embodiment, the visual representation has a set of behavioral movements for different states, including listening (receiving communication from another user), and fidgeting (or idle). These movements are also selected responsive to the selected behavioral characteristics.

The behavioral movements themselves may include facial movements of the visual representation, for example, expressions, body movements of the visual representation, and the generation of audio clips responsive to the behavior or emotion to be expressed.

BRIEF DESCRIPTION OF THE DRAWINGS

FIG. 14*b* is a block diagram of a node.

DETAILED DESCRIPTION OF THE PREFERRED EMBODIMENT

Figure 1:
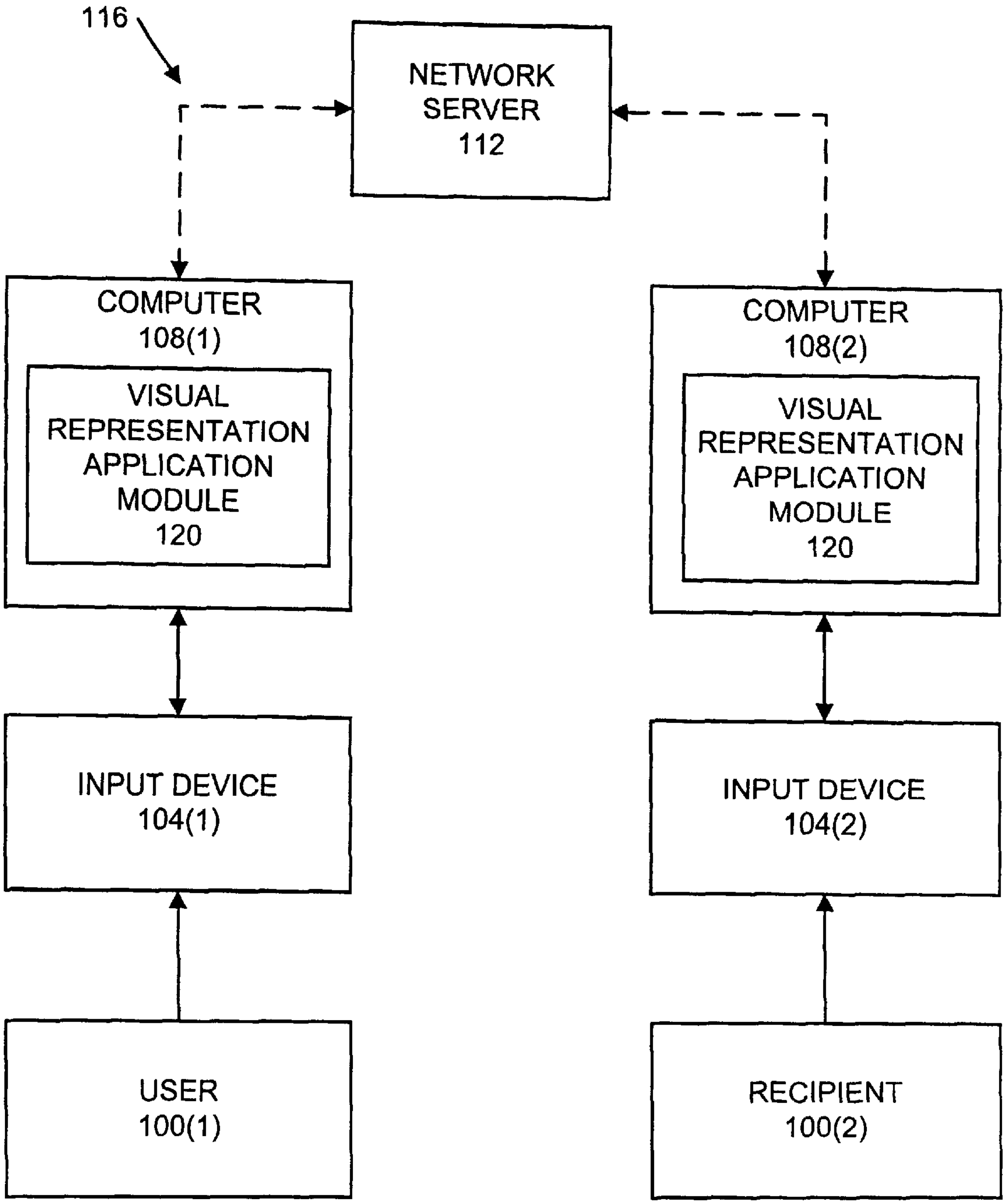
FIG. 1 is a block diagram of a data communications network in accordance with the present invention.

FIG. 1 illustrates a system 116 for remote data communication in accordance with the present invention. A user 100(1) uses an input device 104(1) to control a computer 108(1). The computer 108(1) is typically any personal computer or similar other computing device as is known in art having a monitor or other display device useful for viewing graphical data. If the user 100(1) wants to communicate to a recipient 100(2), who is a second user 100 of the system, the user 100(1) launches a visual representation application module 120 resident on the user's computer 100(1) in accordance with the present invention and connects to an available server 112. Typically, connecting to a server 112 involves opening and maintaining a persistent TCP/IP connection between the user's computer 108 and the server 112. In an alternative embodiment, the application module 120 is resident on the server 112, and user's computer merely receives the data transmitted from the server 112. Next, the user 100(1) invites a recipient 100(2) or recipients to join in a communication session, or they may join simultaneously and without invitation. If the recipient 100(2) accepts, a second persistent TCP/IP connection is established between each of the computers 108 and the server 112 to establish the communication session. A user 100(1) and recipient 100(2) are terms to arbitrarily designate for clarity a sender and receiver of information at a given point during a communication session. At any time, a recipient 100(2) can also send information. Therefore, all references to a user 100(1) made throughout this description apply equally to a recipient 100(2) when the recipient is sending data in accordance with the present invention.

One of the users 100 then produces an utterance. As discussed below, an utterance is a data string which comprises text and/or behavioral information or behavioral commands. The user's computer 108 generates a choreography sequence from the utterance. A choreography sequence is a behavioral movement or sequence of movements that a visual representation of the user 100 will perform in accordance with selected behavioral characteristics to convey an emotional context within which the text portion of the utterance is to be interpreted by some recipient. Alternatively, behavioral commands without text information are transmitted in a choreography sequence to provide independent behavioral information to recipients 100(2). The resultant choreography sequence is sent to the server 112 (as a binary TCP/IP packet) which then relays it back to all participants in the communication session where the choreography sequence is interpreted by application modules 120 resident on their computers 108, which then animates the sender's visual representation on the display(s) of the recipient(s). As is known to one of ordinary skill in the art, the networking portion of this description is only one of a myriad of possible configuration allowing users 100(1) and recipients 100(2) to communicate through computing devices. For example, users 100 may be linked over a local-area-network or they may have a direct connection established between their computers 108. All of these alternate communication configurations are considered to be within the scope of the present invention.

To initiate a communication session, a separate communications interface is used (not shown). The communications interface provides an initiate communication session button to allows the user 100(1) to invite another user 100(2) to enter a real time communication session. Alternatively, selecting an entry listed in a prestored contact list will accomplish the same functionality. Before a request to join a session is transmitted, a requester dialog box is displayed which asks the user 100 which session the invitee is to be asked to join (a new session or an existing session). Once the session type is established, a pop-up dialogue box allows the user 100 to input a short text message to accompany the request. Clicking a send button transmits the invitation, while clicking a cancel closes the requester box without sending the invitation. When inviting a person to an ongoing session, the subject field of the outgoing request contains the names of the users 100 already in the session. In one embodiment, the invention operates in conjunction with a "chat" type communication system, and the invited user 100 receives an incoming chat request event to which they may respond either Yes (after which a communication session is launched) or No (resulting in a request denial being sent back to the user 100).

FIG. 2 is an illustration of a preferred embodiment of a videophone user interface 200 in accordance with the present invention. Generally, the videophone 200 includes one window 228(1) containing a visual representation 232 of the user 100(1), and for each recipient 100(2), a window 228(2) containing a visual representation 232 for that recipient. On the recipient's computer 108(2), two similar windows are displayed to show both the user's visual representation 232 and the recipient's visual representation 232. FIG. 2 illustrates two windows 228 for a communication session; however, additional windows 228 may be added to the display as additional users 100 are added to a communication session. Further, multiple separate communication sessions may be maintained by any one user 100, and the windows 228 containing the visual representations 232 of the participants of each session are also displayed.

The videophone 200 preferably provides a personality setting box 224. The personality setting box 224 enables a user 100 to select a personality type for use in communication. The personality type selected by the user 100 will control the animated behavioral movement of the user's visual representation 232, and is discussed in more detail below. The videophone 200 also provides a mood intensity control 220 which allows the user 100 to control the animated mood of the visual representation 232 to communicate more specific behavioral information. The videophone 200 provides a gesture button 244 to invoke a gesture setting interface, and a customize button 240 is provided to allow the user to tailor the behavior of the visual representation 232 to the user's specifications.

The videophone 200 provides a behavioral and textual communication tool 212 to allow the user 100 to communicate with other users 100. The box 212 provides an area in which the user 100 can enter an utterance 204. The utterance can include text and specific, predefined behavioral commands, such as a gesture command 216 such as "bow." These specific behavioral commands control the behavioral movements of the visual representation 232 in accordance with the behavioral characteristics selected, as discussed below. A text history box 236 is also used to display the history of the communication session.

Figure 2A:
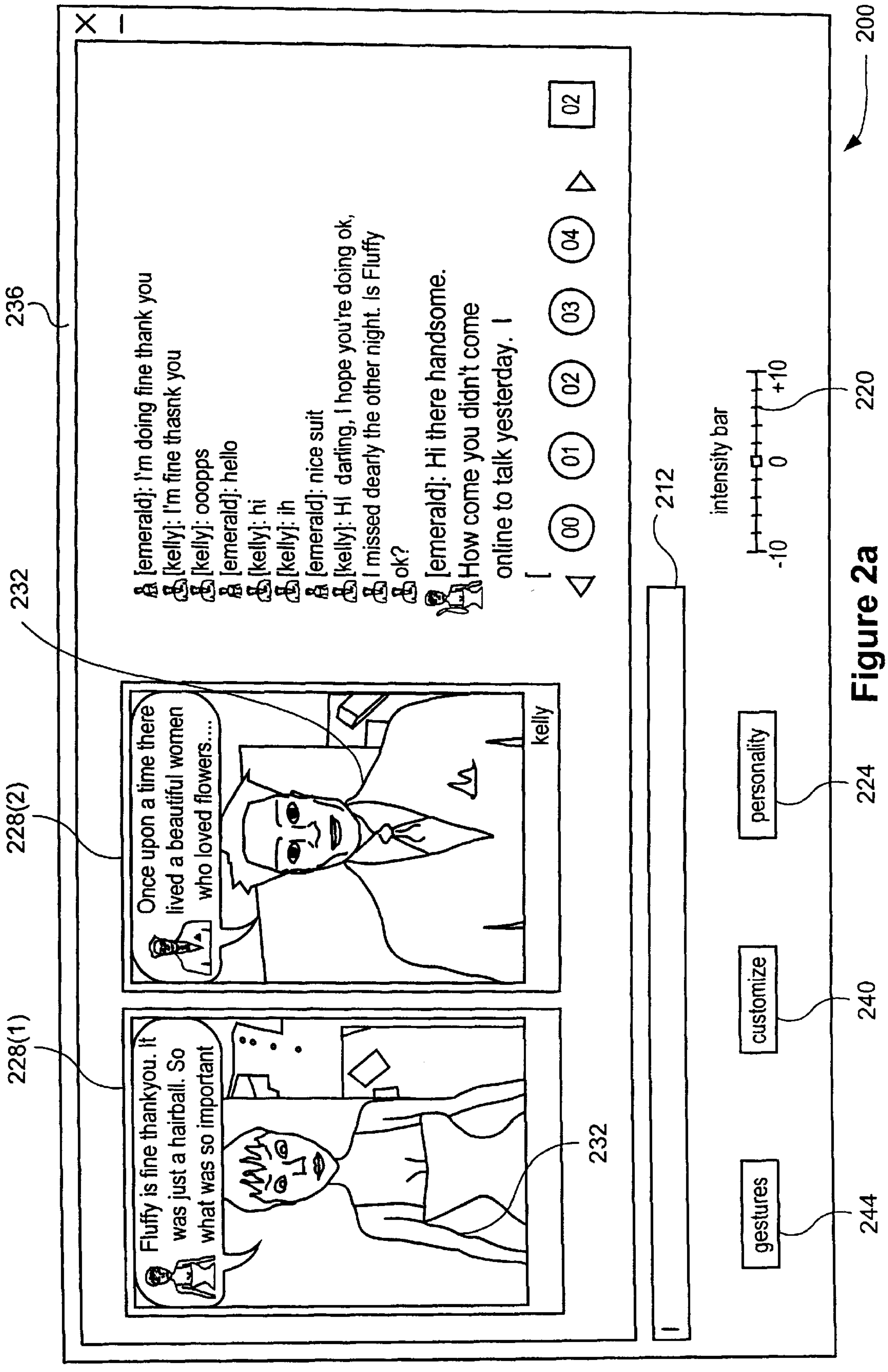
FIG. 2*a* is a block diagram of a preferred embodiment of a user interface for behavioral information communication.
Figure 2B:
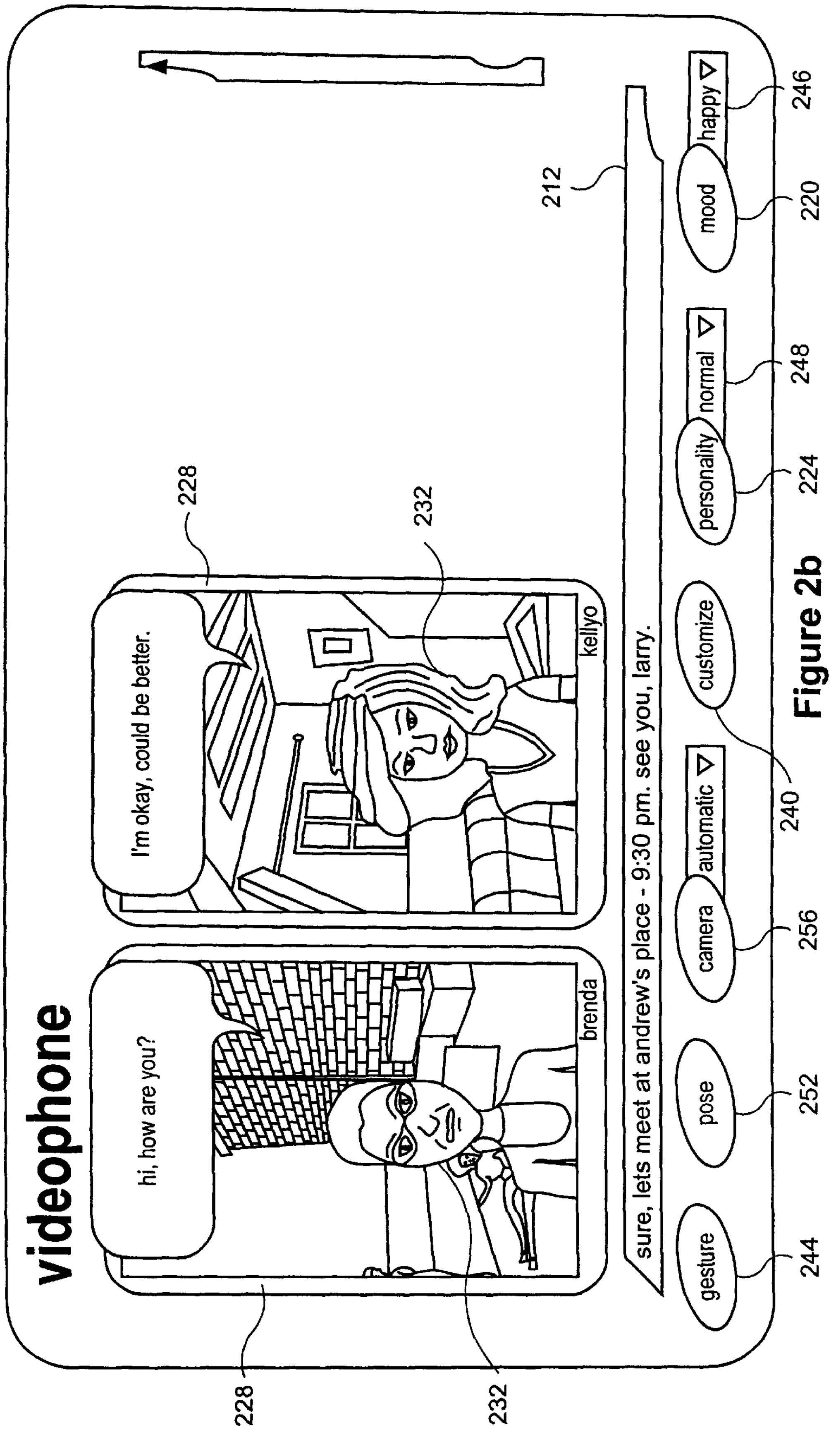
FIG. 2*b* is an alternate embodiment of a user interface for behavioral information communication.

FIG. 2*b* illustrates an alternate videophone user interface 200. In this embodiment, the current mood and personality settings are displayed next to the mood and personality boxes 224, 220 in text windows 248. Also, a camera tool 256 is provided to allow the user to alter the "camera angle" at which the visual representation 232 is seen, thus permitting close-ups or pull-backs to be displayed. A pose button 252 is displayed to allow the user to control the default pose of the visual representation 232 during the communication session.

Figure 3A:
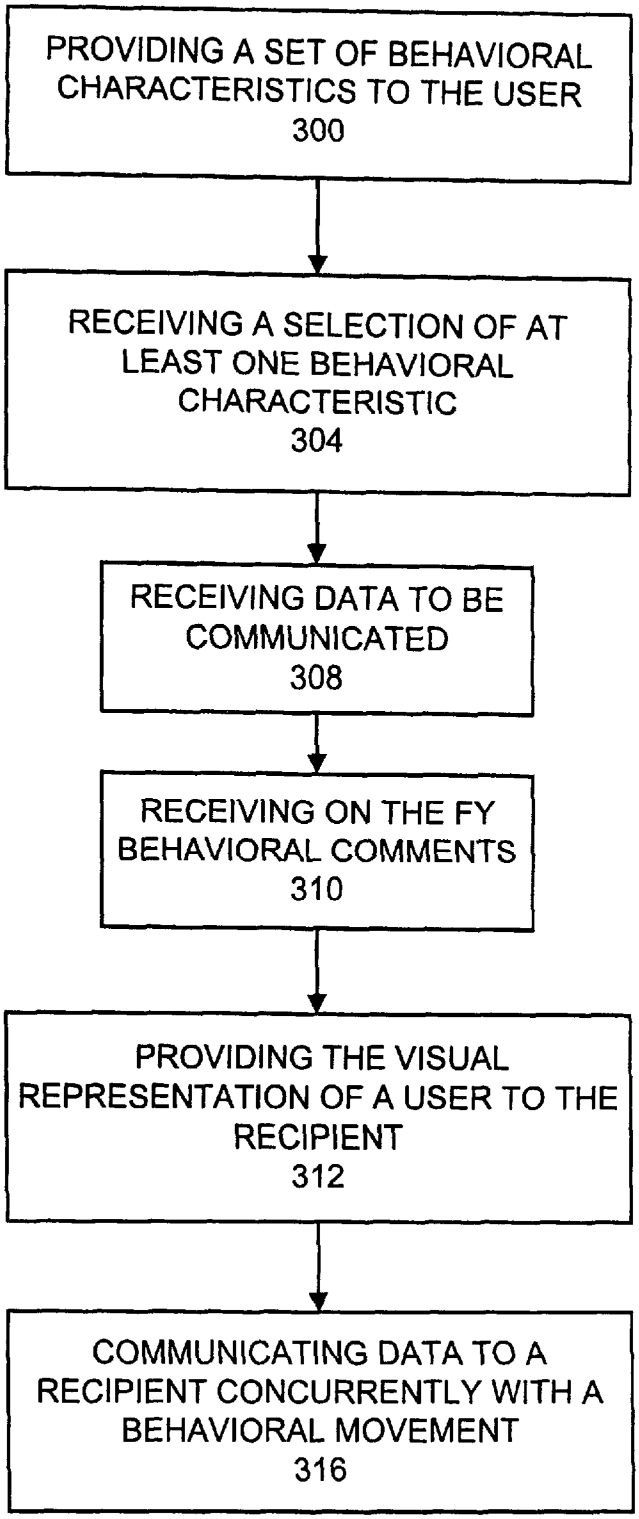
FIG. 3*a* is a flow chart illustrating a preferred embodiment of a method of communicating data to a recipient concurrently with a behavioral movement.
Figure 7:
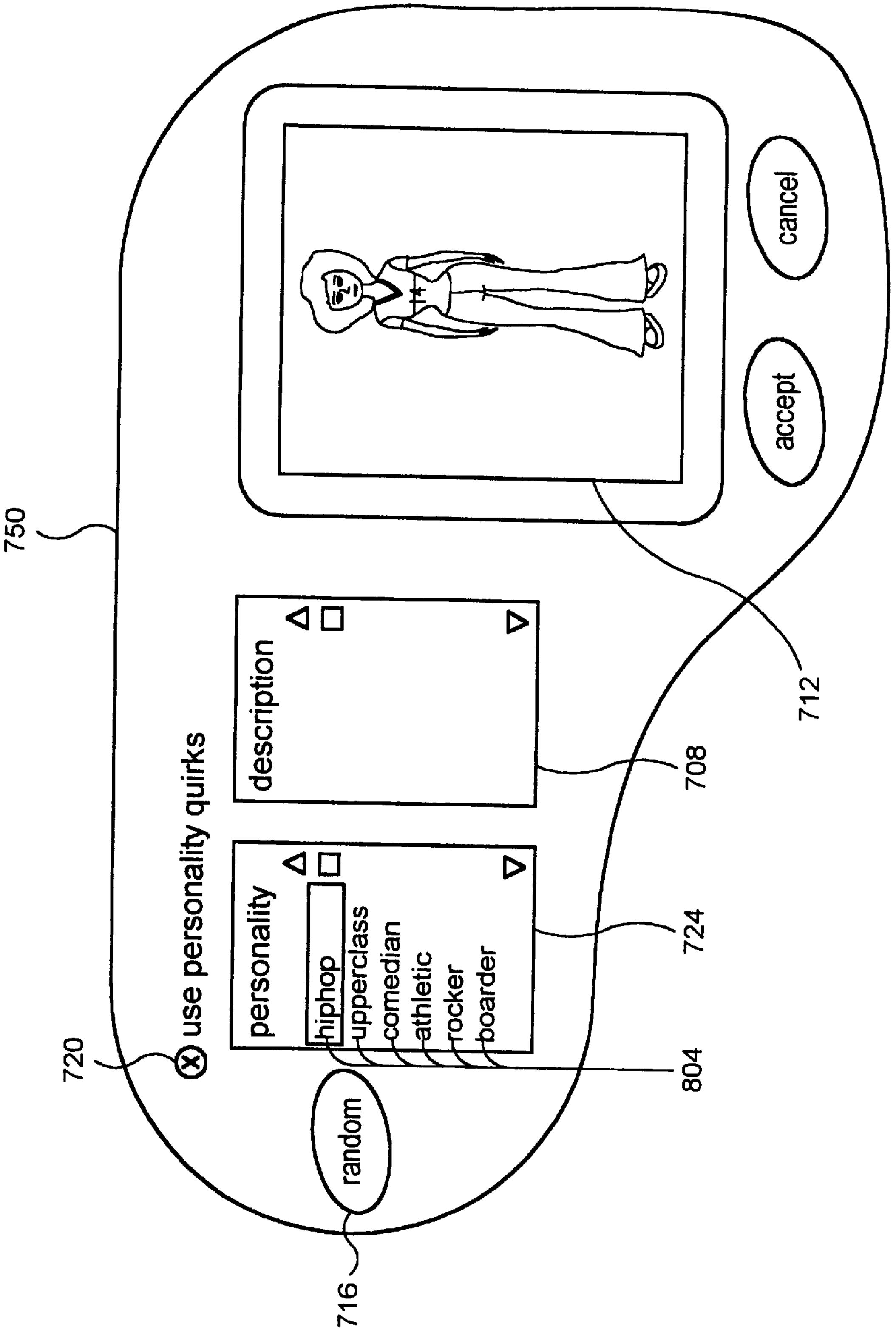
FIG. 7 is a screen shot illustrating an embodiment of a personality setting user interface.

FIG. 3*a* is a flow chart illustrating a preferred embodiment of a method of communicating data to a recipient concurrently with a behavioral movement in accordance with the present invention. The user 100(1) is provided 300 a set of behavioral characteristics to select for the user's visual representation 232. Behavioral characteristics include personality types, and mood settings. The personality types include personalities such as "outgoing," "intellectual," "introverted," "athletic," or other similar types. The mood settings can adjust a personality from being intensively aggressive to cheerful. The personality types are displayed after selecting the personality box 224 as shown in FIG. 7. The mood settings can be selected by the mood tool 220, shown in FIG. 2 and described in more detail with respect to FIGS. 9*a* and 9*b*.

The user 100(1) selects a behavioral characteristic or characteristics to be associated with the user's visual representation 232, from the behavioral characteristics displayed, as shown in FIG. 7. The selection is received 304 by the application module 120. Next, the application module 120 receives 308 the data to be communicated to the recipient 100(2). The data is typically text, but can include information in other media.

The visual representation 232 of the user 100(1) is then provided 312 to the user 100(1) and the recipient 100(2). In conventional systems, text to be communicated is transmitted without any behavioral information to provide context, and thus the communication between user 100(1) and recipient 100(2) is stripped of valuable behavioral information. In accordance with the present invention, however, the application module 120 communicates 316 the data to the recipient 100(2) concurrently with a behavioral movement of the visual representation 232 associated with the selected behavioral characteristic, where the behavioral movement provides an emotional context to the recipient 100(2) for interpreting the communicated data. The behavioral movement is the manifestation of the behavioral information conveyed by the user 100 through the selection of behavioral characteristics, through providing explicit behavioral commands, or through the choice of specific text in the data string. Upon viewing the behavioral movement of the user's visual representation, the recipient 100(2) can interpret the data communicated by the user 100(1) within an emotional context.

For example, if the sender chooses an extrovert personality type, with a positive mood setting, the recipient will see the text animated with big hard motions, smiles and lots of movement. Then, if the sender sends a message such as "I think she likes me" with this setting, the recipient will get a sense that the sender is very enthusiastic about the person referred to. The sender's behavioral information is thus communicated to the recipient through the behavioral movements of the visual representation 232, providing an emotional context to view the text sent by the sender. Alternatively, if the user selects a negative mood setting, the visual representation 232 has depressed facial movements such as frowns and downcast eyes, and body movements like shuffling feet. If a sender then says a message, "I don't know how I did on the test," a head shake corresponding to the "I don't know" is selected corresponding to the negative mood setting; and the recipient knows that the sender is not optimistic about the results. Of course, the emotions communicated may not reflect the sender's actual emotions, as the sender can choose any personality or mood setting and have that choice of behavioral characteristic communicated to the recipient. Thus, the present invention allows people to, just as they would in the actual world, "put on a happy face," and also allows them to adopt different moods and personalities for fun. For whatever the reason the user selects behavioral characteristics, the present invention conveys that selection through the appropriate behavioral movements.

In one embodiment, the selection of behavioral characteristics includes receiving 310 selection of on-the-fly behavioral information from the user 100(1) to communicate to the recipient 100(2). The on-the-fly behavioral information is communicated as specific behavioral commands such as gesture commands, specific mood settings, personality settings, or through the analysis of the content of the text communication of the utterance. For example, a disclosure may be: "Hello Tom (wink)," "How are you today (smile)," "How's life in the salt mines at ACME Corp.? (RASPBERRY)." The gesture commands (wink), (smile), (raspberry) cause the user's visual representation 232 to act out the command to emphasize the text and provide additional behavioral information.

In a preferred embodiment, discussed in detail below, the text communicated by the sender is analyzed for its content, and behavioral movements associated with the content are selected, also responsive to the user's selected behavioral characteristics. For example, if the sender types in the utterance "You're a big loser", the application module recognize the use of a xenocentric word ("you") and a volumetric word "("big"). The behavioral movements associated with xenocentric and volumetric words are selected to animate the sender's visual representation 232. However, the specific behavioral movements selected are chosen responsive to the sender's personality and mood settings. For example, if the sender has selected a "hiphop" personality, and a positive mood setting, the visual representation 232 is animated with a big point toward the user, big facial movements tracking an exaggerated "you", large hand separation to show "big", and a smile to show the communication is not meant to be taken seriously. Thus, by analyzing the text of the utterances, more relevant behavioral movements are selected to communicate the sender's behavioral information.

As discussed above, behavioral movement information, comprising instructions for performing the behavioral movement, are transmitted to the application module 120 residing on the recipient's computer 108(2), which translates the behavioral movement information into behavioral movements. The behavioral movement information is preferably sent as part of a choreography sequence which is a specific format for transmitting the behavioral movement information specifying the timing and order of the movements to be performed, and providing links to the movements themselves which are stored on the recipient's computer 108. Alternatively, in an embodiment where the animation sequences themselves are not stored on the recipient's computer, the behavioral movements themselves are transmitted to the recipient's computer 108, which then merely reproduces the movements on the recipient's display.

Figure 3B:
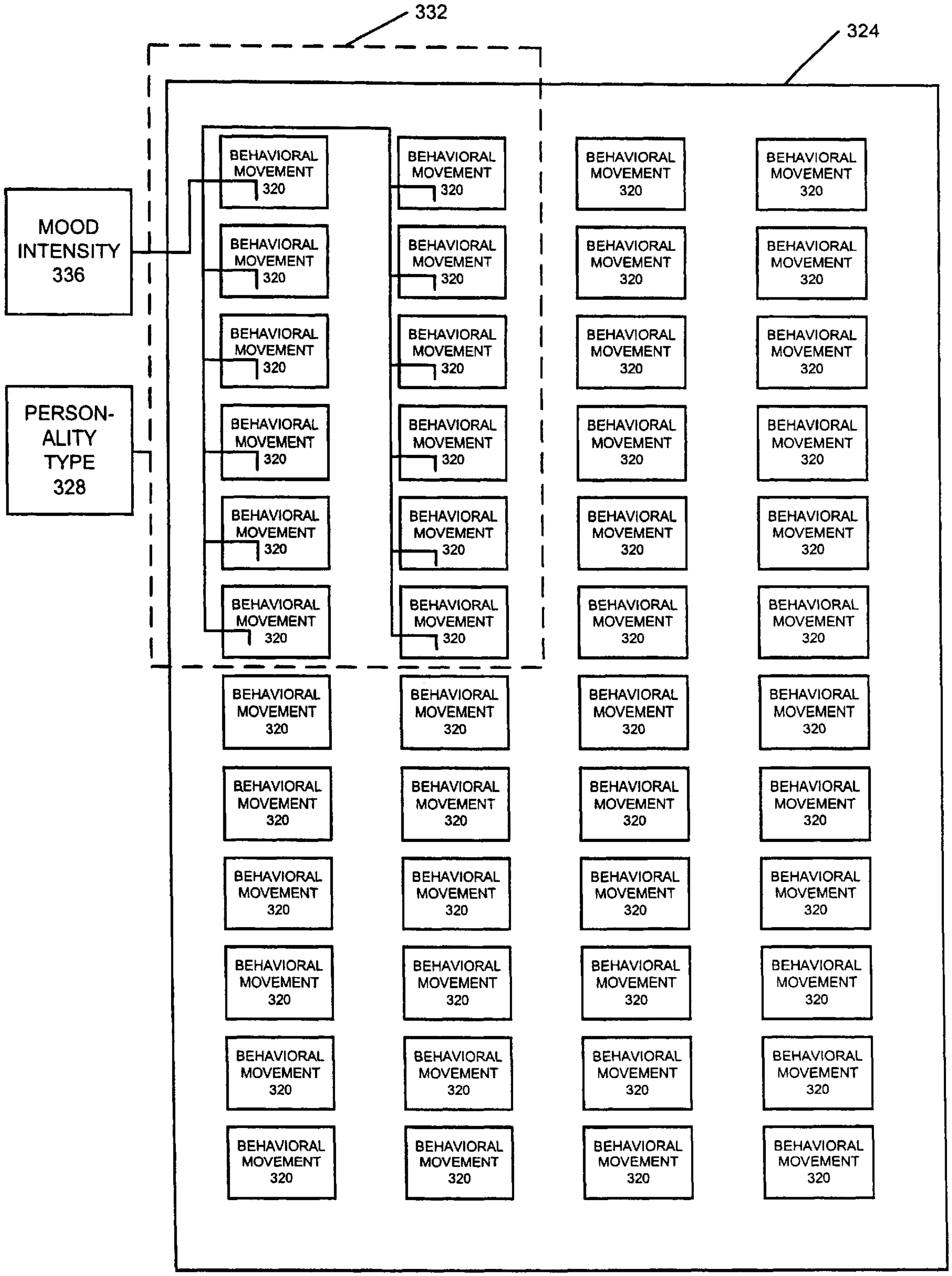
FIG. 3*b* is a block diagram illustrating the relationship between personality types, mood intensity and behavioral movements.

As shown in FIG. 3*b*, behavioral movements 320 are preferably selected from a library 324 of behavioral movements 320 provided to the application module 120. Selection of a behavioral movement 320 with which to animate a visual representation 232 is determined by the user's selection of behavioral characteristics. In the preferred embodiment the selection of a personality type 328 selects a subset 332 of behavioral movements 320 from the library 324. Selection of a mood intensity setting 336 sets weights for each behavioral movement 320 in the subset 332 and thereby determines the probability of selection of a particular behavioral movement 320. The specific weights defined by each mood intensity setting in combination with a personality type 328 selection are preset by the application module 120. Thus, in operation, when the application module 120 is required to select a behavioral movement 320, for example, if the sender types in a phrase such as "Hello," of the several behavioral movements 320 in the library 324 associated with "Hello", the behavioral movement 320 associated with the phrase "Hello" by the selection of the personality type 328 and given the highest weight by the selected mood intensity 336 is selected by the application module 120. For example, if the sender selected an introverted personality type 328 with a low mood intensity setting 336, a small shake of the hand behavioral movement 320 is selected, thus communicating the depressed state selected by the sender. If the personality type 328 is extroverted, and the mood setting 336 is high, the phrase 'Hello' evokes a big wave and a smile facial behavioral movement 320. Thus, selection of a behavioral characteristic by the sender determines the behavioral movement animated by the user's visual representation 232, and thus communicates valuable behavioral information to the recipient.

Figure 4A:
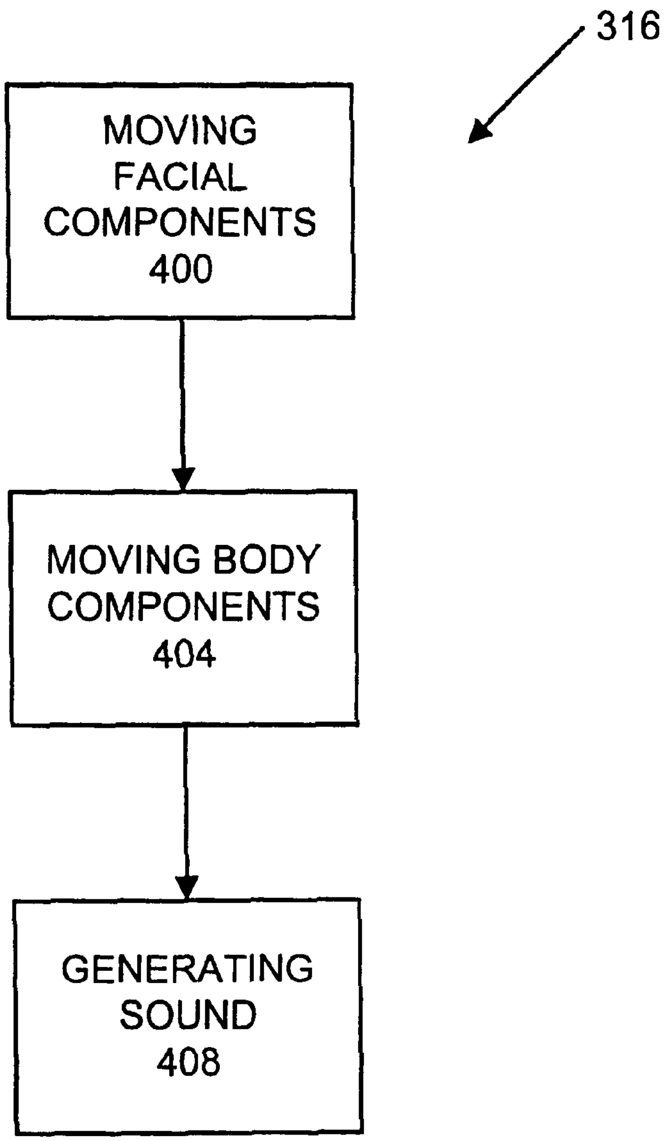
FIG. 4*a* is a flow chart illustrating an alternate embodiment of a more detailed method of communicating data to a recipient concurrently with a behavioral movement.

FIG. 4*a* is a flow chart illustrating a method of communicating data to a recipient concurrently with a behavioral movement 320 in accordance with the present invention. A behavioral movement 320 comprises an animation primitive or sequence file that animates the visual representation 232 when executed. In one embodiment, behavioral movements 320 also include sound effect files. The movements 320 themselves are preferably accomplished through the animation of skeletons underlying the visual representations 232. In one embodiment, there is one skeleton for each male and female visual representations consisting of 42 bones (plus 3 additional bones for hair movement). The head and body are animated separately and synthesized at run-time. This provides for independent control of the head and body of the visual representation 232. Other methods of animating a visual representation 232 are considered to be within the scope of the present invention.

In accordance with FIG. 4*a,* a behavioral movement 320 is an animation 400 of the facial components of the visual representation 232. The behavioral movements 320 of a facial component of a visual representation 232 include smiles, frowns, glares, winks, raising of an eyebrow (to express incredulity), yawning, rolling eyes, or any other facial expression that can be animated to provide context to a data communication. Additionally, the facial components can simulate speaking the written text, utilizing the synchronization of dialogue or text display and facial speaking movements 320. In this embodiment, the facial animation of the speaking visual representation 232 mimics the articulatory gestures of a human speaker through known text-to-phoneme processing techniques.

The body components of the visual representation are also animated 404 as appropriate to behavioral characteristics as commands. Body behavioral movements 320 can include shaking a fist, waving, fidgeting (perhaps to show boredom), tossing a coin, snapping fingers, large hand sweeping movements 320 to show high emotions, and other body movements that can be animated to provide context to a data communication.

Finally, the application module of the recipient generates 408 sound or audio clips as a behavioral movement 320 response to the sender's choreography sequence to provide further context for the data communication. Sound clips include laughter or clapping to accompany facial and body movements. Sound clips can provide independent contextual information through exclamations such as "ooh," "aah," "wow," "ow" or the like. Other audio clips may also be played during the communication of the data to provide contextual information, such as different types of laughter, or raspberries, or sobbing.

Figure 4B:
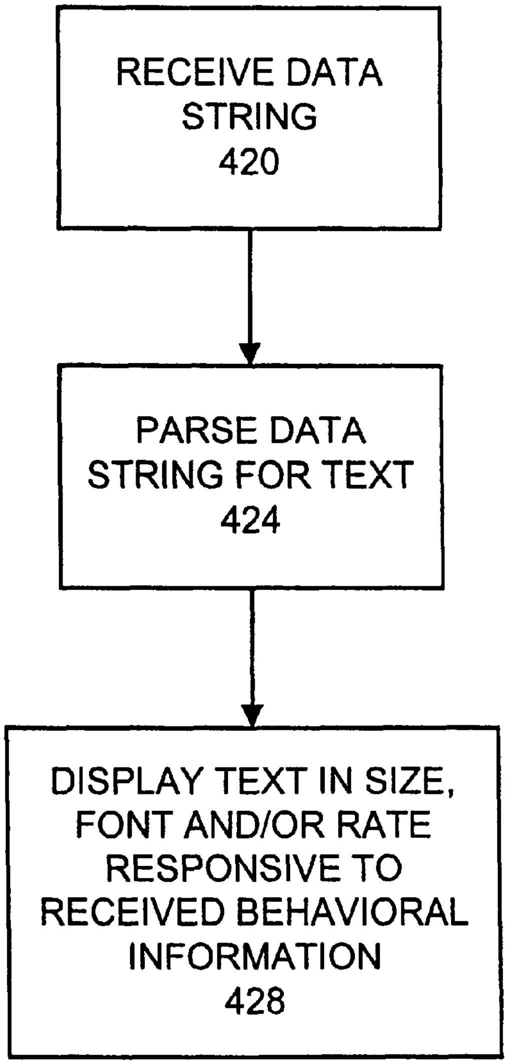
FIG. 4*b* is a flow chart illustrating displaying text responsive to received behavioral information.

FIG. 4*b* illustrates a method of displaying text in accordance with selected behavioral characteristics to further communicate behavioral information to a remote recipient 100(2). The text is analyzed by the sender's application module 120, and then the modified text is transmitted to the recipient. First, a text string is received 412. Next, the text string is parsed 416 for text. Parsing is accomplished using a conventional parsing methodology as is known to those of ordinary skill in the art. Then, the text is displayed 420 to the recipient in a size, font, and/or rate responsive to the received behavioral information. For example, if the user 100 selects an intense mood intensity, text may be displayed on the screen at a fast rate, or in a large font size, or in a bold typeface in a particular font. If the user 100 selects a more relaxed intensity, the text may be displayed more slowly, in a smaller size, and in normal typeface, with a different font (e.g., italic).

The display of text can also be controlled by the selection of behavioral characteristics, such as personality settings, by behavioral commands such as gestures, or by the content of the data string, by examining the text for predefined phrases, or other indicators. For example, if a sender chooses an introverted personality with a depressed mood setting, the text is displayed in small plain font and at a slow rate. If an exclamation point is used, the sentence is displayed in all capital letters in a different color, such as red, to indicate excitement. Thus, this display of the text communicates the mood of the sender, providing the recipient with the emotional context with which to interpret the information. Finally, the application module 120 can display text responsive to a general flow of a communication session. Thus, if users 100 are quickly typing and sending messages, the text can reflect the more frantic pace of communication, for example, by being displayed cramped together and in a smaller font size, and if the messages are created more slowly and thoughtfully, this behavioral information can be communicated through the rate and appearance of the text as well, for example, with more spacing between the words and in a larger font size.

Figure 5:
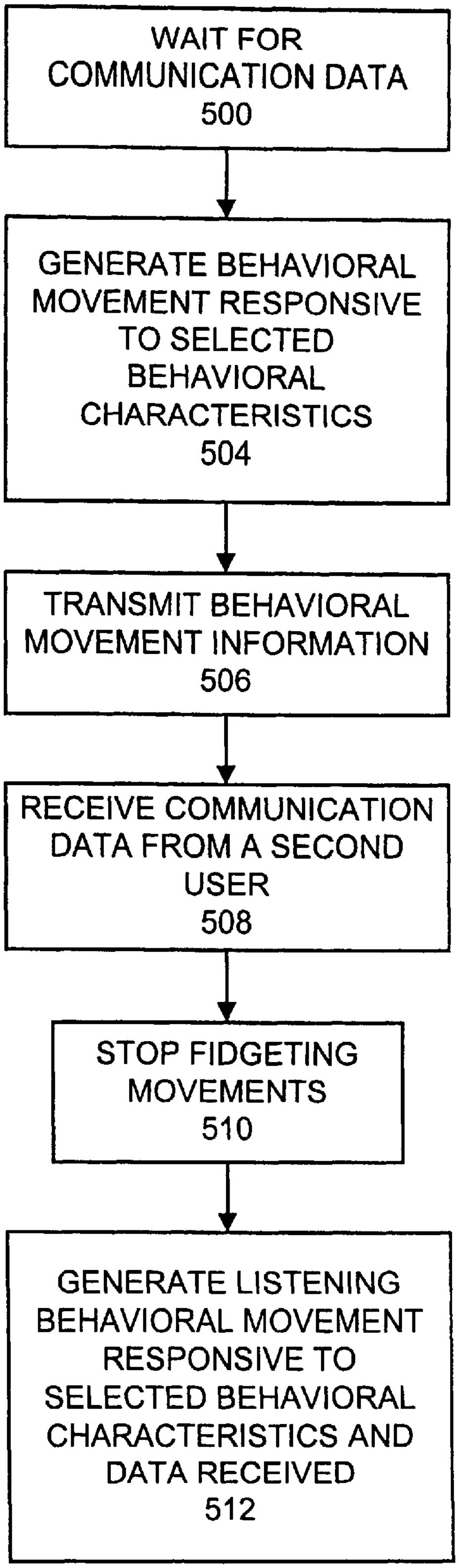
FIG. 5 is a flow chart illustrating communicating data to a recipient concurrently with a behavioral movement responsive to alternate communication states.

FIG. 5 is a flow chart illustrating communicating a behavioral movement 320 responsive to alternate communication states. In these states, behavioral information is conveyed to a recipient 100(2) without transmitting text data. In the preferred embodiment, there are three states: acting, listening, and fidgeting. Acting refers to the state when the visual representation 232 is either talking or gesturing, as described above in connection with FIG. 3. For either talking or gesturing, the behavioral movement 320 of a visual representation 232 is a result of explicit actions by the user 100.

For the listening state, whenever another user 100 is acting (talking or gesturing) the user's visual representation 232 appears attentive; however, the degree of attentiveness is a function of the personality type 328 or other behavioral characteristic selected by the user 100. In general, these movements 320 reflect listening movements, for example, when text is received, the visual representation 232 nods occasionally or otherwise indicates that it is 'following' the oration. The fidgeting state refers to a state in which the user's visual representation 232 is neither acting nor listening. In this state as well, the behavioral movements 320 of the visual representation 232 are selected responsive to the selected personality 328 or other behavioral characteristic of the visual representation 232. How the visual representation 232 acts in an idle state is therefore a function of the behavioral characteristics selected by the user 100. Fidgeting can include having the visual representation 232 sway or blink, or perform more complicated animations reflective of the selected behavioral characteristic such as cleaning the 'glass' of the window 228 containing the visual representation 232 (if the personality type 328 selected is, for example, a "comedian" personality).

As only one state can exist at a time, in accordance with the present invention, the acting state is set at a higher priority than the listening state, and the fidgeting state is given the least priority. Thus, upon receipt of a communication from a user and a second user, the visual representation 232 will be placed in the acting state. If the user's visual representation 232 is in the fidgeting state, and a communication is received, the visual representation 232 will be placed in the listening state.

As illustrated in FIG. 5, the default state of the application module 120 is awaiting 500 communication data from any user 100. Responsive to receiving no communication data, the application module generates 504 a choreography sequence responsive to the selected behavioral characteristics for the visual representation 232. The choreography sequence is transmitted 506 to the recipients' 100(2), who then view the user's visual representation's behavioral movements 320 after interpreting the received choreography sequence The behavioral movement 320 thus conveys behavioral information regarding the user 100 without requiring the transmission of explicit data. Upon receipt 508 of communication data from a second user 100, the fidgeting movements are stopped 510 and the user's 100 application module generates 512 a listening state choreography sequence responsive to the selected behavioral characteristics. The choreography sequence is transmitted to the recipients' computers 108, who then can view the listening behavioral movements 320 of the user's visual representation 232 to understand the current state of the user 100, for example, whether the user 100 is attentive, or is bored, etc.

Figure 6:
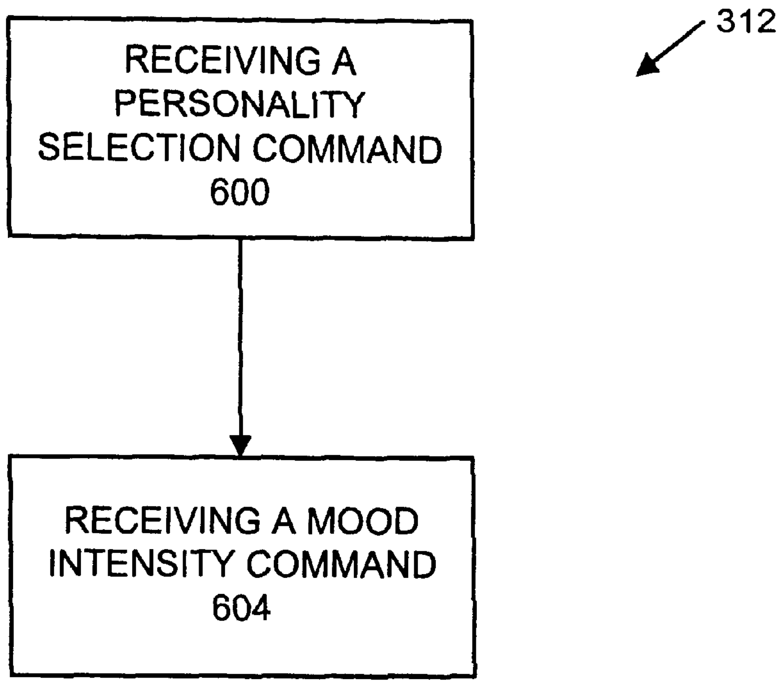
FIG. 6 is a flow chart illustrating a preferred embodiment of a more detailed method of receiving an initial selection of a behavioral characteristic.

FIG. 6 is a flow chart illustrating a preferred embodiment of a more detailed method of receiving an initial selection of a behavioral characteristic in accordance with the present invention. In this embodiment, the application module receives 600 a personality selection command from a user 100 to select a personality type 328 for the visual representation 232 and receives 604 a mood intensity command that selects a mood intensity 336 for the personality type 328 selected. These selections are received at an initial set-up of the visual representation 232 to determine an overall context for communications transmitted by the user 100. However, during specific communication settings, the personality and mood settings can be changed to provide a specific context for a particular communication.

FIG. 7 illustrates a personality settings interface 750 for selecting a personality type 328. This window is displayed to the user 100 after selecting the personality box 224 from the main interface 200. A personality type 328 is the encapsulation of everything required to drive the visual representation's behavior in accordance with the selected behavioral characteristics. As such, the personality type 328 is associated with behavioral movements 320 for talking, gesturing, listening, and fidgeting movements that may be specific to the personality 328. For example, a cynical personality is associated with facial movements such as raised eyebrows, and body movements such as folded arms, and a comedian personality has smiles weighted more heavily for selection, and has hand motions selected more often during communication.

Figure 8:
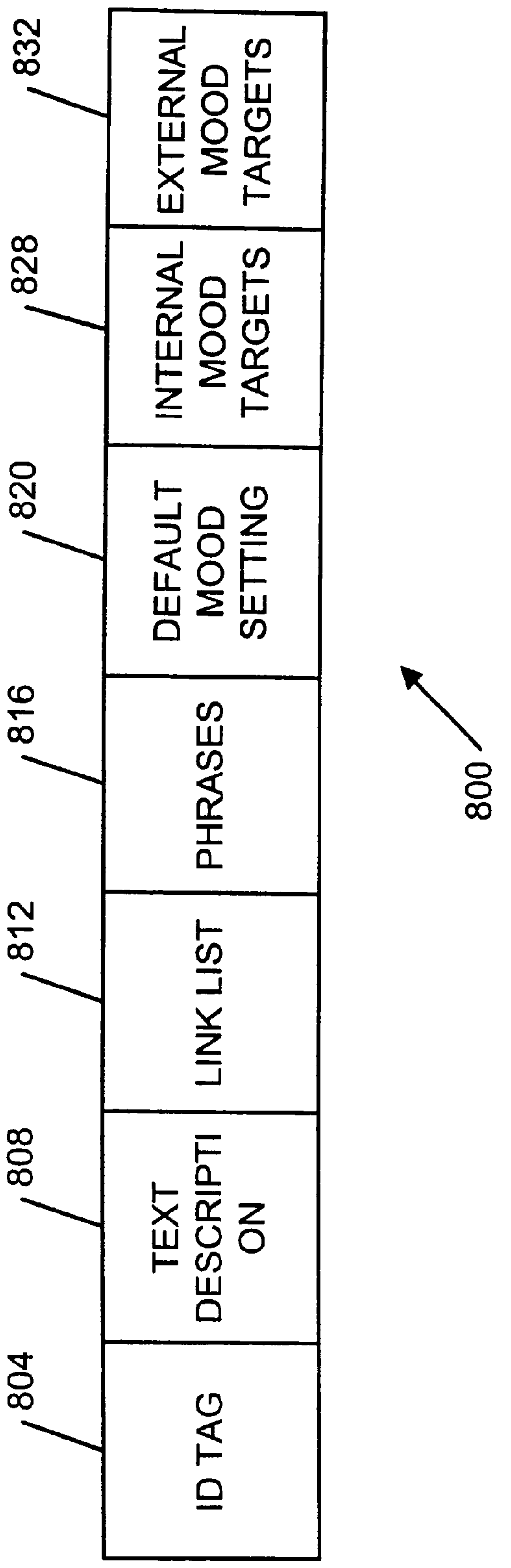
FIG. 8 is a block diagram illustrating a personality data file.

In a preferred embodiment, as shown in FIG. 8, personality types 328 are maintained as a single data file 800 containing an identification tag 804 for the personality (a descriptive adjectival phrase used in the selection menu 724 of the personality selection screen 700), a text description 808 of the personality (used in the personality selection screen 724), links 812 to behavioral movements 320 for talking, gesturing, listening, and fidgeting, with weightings that describe the personality's propensity to perform a particular behavioral movement 320 given different mood intensity settings 336, a lexicon 816 of phrases which the personality 328 is responsive to and links to the behavioral movements 320 that those phrases elicit, a default mood intensity setting 820, mood intensity targets 828 for active and dormant usage, and mood intensity targets 832 used in reaction to other characters' mood intensities. After a personality type 328 has been selected, the personality data file 800 associated with the personality type 328 is stored either on the user's computer 108, the network server 112, or both. The personality file 800 thus contains information about which behavioral movements 320 to use in which context (talking, fidgeting, listening, gesturing, or in connection with natural language processing). The personality file 800 also uses the weightings set by the mood intensity setting 336 to determine how to use the behavioral movements 320 associated with the personality type 328.

Referring to FIG. 7, the personality setting screen 750 and functionality is implemented as a Microsoft Windows 95 MFC application; however, other implementations known to those of ordinary skill in the art are within the scope of the present invention. This function is accessed automatically when the user first initiates a product in accordance with the present invention and also from a preferences menu of the system. Once invoked, the user is preferably presented with the following interface:

- A scrollable menu 724 of possible personality selections. These items are adjectival phrases 804 which describe the personality type 328.
- A scrollable text box 708 for displaying the written description 808 of a personality.
- A render view window 712 depicting the user's visual representation 232 in different personality types.
- A Random button 716 for randomly selecting a personality type 328.
- A check-box indicator 720 for toggling use of personality quirks.

Upon invoking the personality selection screen, the interface may indicate that no personality type 328 is selected (i.e., when the user first uses the product), and then:

- The menu 724 of personality selections contains no highlighted item.
- The personality type 328 description box 708 is empty.
- The personality quirks check-box 720 is blank.
- The view window 712 depicts the visual representation 232 standing statically.

If a personality type 328 has been previously selected, then:

- The currently established personality type 328 (i.e., that which the user has previously saved) is displayed.
- The menu 724 of personality selections is scrolled so that the currently established personality type 328 is highlighted.
- The personality description box 708 contains the written description 808 of the personality type 328.
- The personality quirks check-box 720 is set to either blank or checked depending on what it was set to when the user 100 previously established the selection.
- The view window 712 depicts the user's visual representation 232 animated in fidget mode.

A personality type 328 may be selected by selecting an entry in the personality selection menu 724. Upon selection, the selected item 328 in the menu 724 of personalities is highlighted, a written description 808 of the personality type 328 is placed in the text window 708, and the view window 712 depicts the user's visual representation 232 is animated in the selected personality's fidget mode, which reflects behavioral movements 320 associated with the selected personality 328. The menu description 808 is intended to be a short, descriptive adjectival phrase (e.g., "anxiety prone intellectual"). More information regarding the personality type 328 is provided to the user 100 through selection of a personality type 328.

In one embodiment, an utterance override is generated by selecting a personality type 328 from within a communication session by entering in a specific personality type 328 in an utterance, with demarcating symbols, for example, by typing in "(flamboyant") within an utterance. The override pertains only to the interactions of the current session and are not persisted, therefore affecting neither other currently active sessions nor future sessions. Alternatively, the user 100 can select the personality type override to affect a single utterance within a communication session. To set an override, an override button is selected and a personality bar is displayed to provide the single communication session or single utterance override. The personality bar is preferably a pull down menu 248 containing the list of available personality types 328, as shown in FIG. 2*b*, any one of which the user 100 may select. Upon selection, the visual representation 232 acts in accordance with the behavioral movements 320 associated with the newly selected personality type 328 for the session or utterance, as designated, and then the visual representation 232 reverts back to acting in accordance with the default setting after the session or utterance has terminated. Thus, the user 100 is given the flexibility to transmit session or utterance specific behavioral information for a specific session or utterance.

Figure 9A:
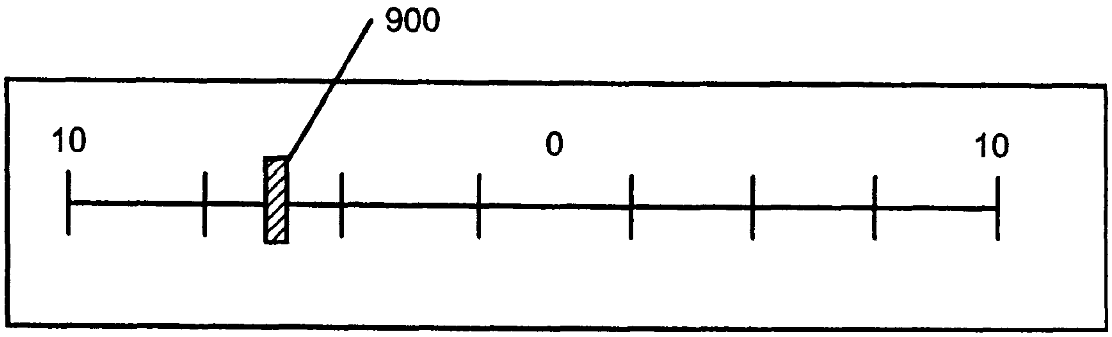
FIG. 9*a* is a screen shot illustrating an embodiment of a mood setting user interface.

FIG. 9*a* illustrates a mood intensity setting interface 220 which is typically displayed in the main screen 200. As illustrated in FIG. 9*a*, the mood intensity setting interface 220 displays a sliding bar 900 which allows the user 100 to set an intensity value 336, or a mood field, for the mood of the visual representation 232. The user 100 sets mood intensity values 336 for the visual representation 232 by sliding the mood intensity setting bar 900. In a preferred embodiment, mood intensity values 336 are integers that fall in the range −10 (intensely aggressive) to 10 (intensely positive), with 0 indicating indifference. The mood intensity setting 336 selected by the user 100 is the mood intensity that the visual representation 232 adopts upon initiation of a remote communication. These mood intensity settings 336 have a bearing on the body language (i.e., body movements) and facial settings (i.e., facial movements) of the visual representation 232, allowing the visual representations 232 to affect a wide spectrum of attitudes. The effects of mood intensity 336 on a personality type 328 are preset through use of the personality setting interface 728 and weightings described above.

The mood intensity slider 220 is implemented as a standard scroll bar. Users 100 may scroll to any setting or click anywhere on the slider to snap to the desired value 336. For mice adequately equipped, rolling the central button wheel adjusts the scroll bar (rolling down adjusts the bar to the left, rolling up adjusts the bar to the right).

In one embodiment, personality quirks are implemented to provide greater depth of personality information. Personality quirks are tendencies that the personality type 328 has with respect to a given mood intensity 336. In one preferred embodiment, quirks comprise specific behavioral movements 320 for a visual representation 232, and enabling the personality quirk check box 720 provides links to specific behavioral movements. For example, a quirk may be winking, shuffling feet, playing with hands, or other similar movements. Quirks are unique to a personality type 328, and therefore convey specific information regarding a personality. The personality quirk check-box 720 allows the user 100 to decide whether or not their visual representation 232 will utilize these tendencies.

Figure 9B:
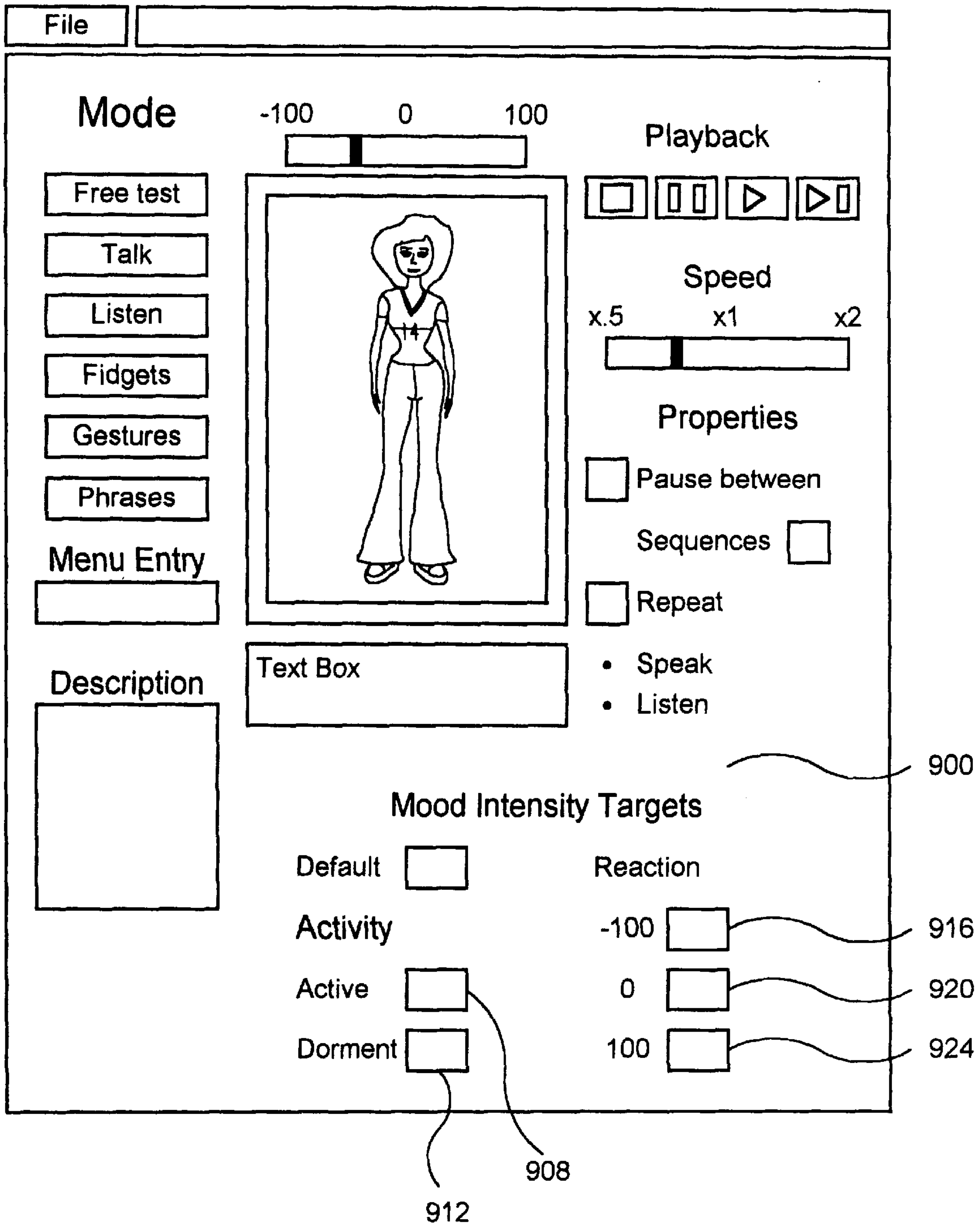
FIG. 9*b* is a screen shot illustrating a further embodiment of a mood setting interface.

In a further embodiment, enabling personality quirks sets a first mood intensity 336 to which the personality 328 will incrementally approach when the user 100 is active (chatting frequently and in volume), and a second mood intensity 336 to which the personality 328 will incrementally approach when the user 100 is dormant. These quirks are implemented by setting the internal mood targets 828 of the personality file 800 to a desired value. As shown in FIG. 9*b*, dormant and active mood intensity targets 908, 912 are set in a personality file 800 to dynamically adjust the behavior of the visual representation 232 during a communication session. The interface 900 is preferably used by the application developer to assign the mood targets 824, 828 to a personality type 328. The activity mood intensity targets 908, 912 are the mood intensities 336 that the personality of the visual representation 232 incrementally approaches during a communication session. The shift in mood intensity 336 is based on the activity of the user 100, for example, based on the frequency and volume of chat in the communication session. Typically, visual representations 232 of inactive users 100 (those who chat little) will have their mood intensity 336 creeping towards the center of the mood intensity scale (indicating a fall off in intensity due to inactivity) while active users 100 will see a shift towards the positive intensity (right) end of the bar. While these propensities are true in the general case, the targets are arbitrary and may be set to any value for a particular personality.

Quirks also are used to control behavior of the visual representation 232 responsive to the mood intensity of other users 100 participating in a communication session. The quirks are implemented by setting values of the external mood intensity targets 832 to which the visual representation 232 will incrementally approach when interacting with other visual representations 232. As shown in FIG. 9*b*, reaction mood intensity targets 916, 920, 924 are used to establish mood intensities 336 that the personality of the visual representation 232 approaches based on the mood intensity 336 of the other user(s) 100 in the communication session. The application module sets the targets 916, 920, 924 based on user 100 input specifying median and pole mood intensity values. For example, a target of +5 as the median and 0 and +10 as the poles may be selected for the personality file 800. In this example, the user's visual representation 232 will creep to 0 if met with another user who is at −10, thus reflecting the mood of the other user, who is "bringing him down." Therefore, every visual representation 232 is, to a greater or lesser extent, influenced by the personalities 328 and mood settings 336 of the visual representations 232 with which they interact during a communication session.

Finally, an utterance override can be set by a user 100 to provide one-time mood intensity application during a particular communication session or utterance, similar to the personality type override described above. In this embodiment, during a communication session, the user 100 selects a pop-up mood intensity interface and adjusts the value of the pop-up mood intensity slider to the desired mood for this communication session. Alternatively, the user can type in a mood setting 336 directly, for example, by entering "(5)" prior to a text string. Responsive to this setting, the visual representation 232 alters its behavioral movements 320 to match the selected mood intensity 336 for the session or for the specific utterance. The changes in mood intensity 336 persists only for the single session or utterance, and does not affect the behavior of the user's visual representation 232 for other sessions, if a single session is selected, or throughout the communication session, if a single utterance is selected. Again, this allows the user 100(1) to communicate specific behavioral information to recipients 100(2) for a single session or utterance.

Figure 10A:
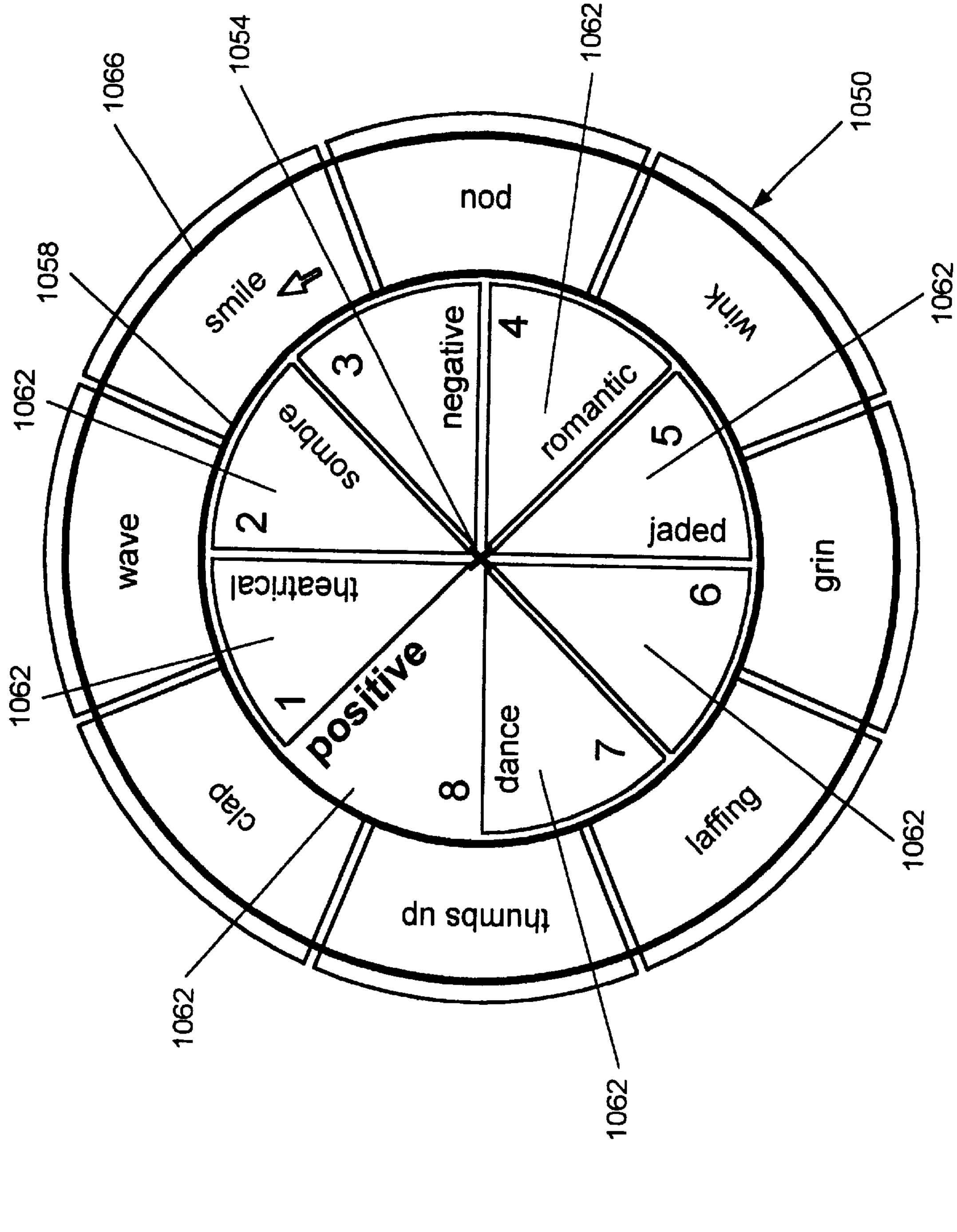
FIG. 10*a* is a screen shot illustrating a gesture wheel interface.
Figure 10B:
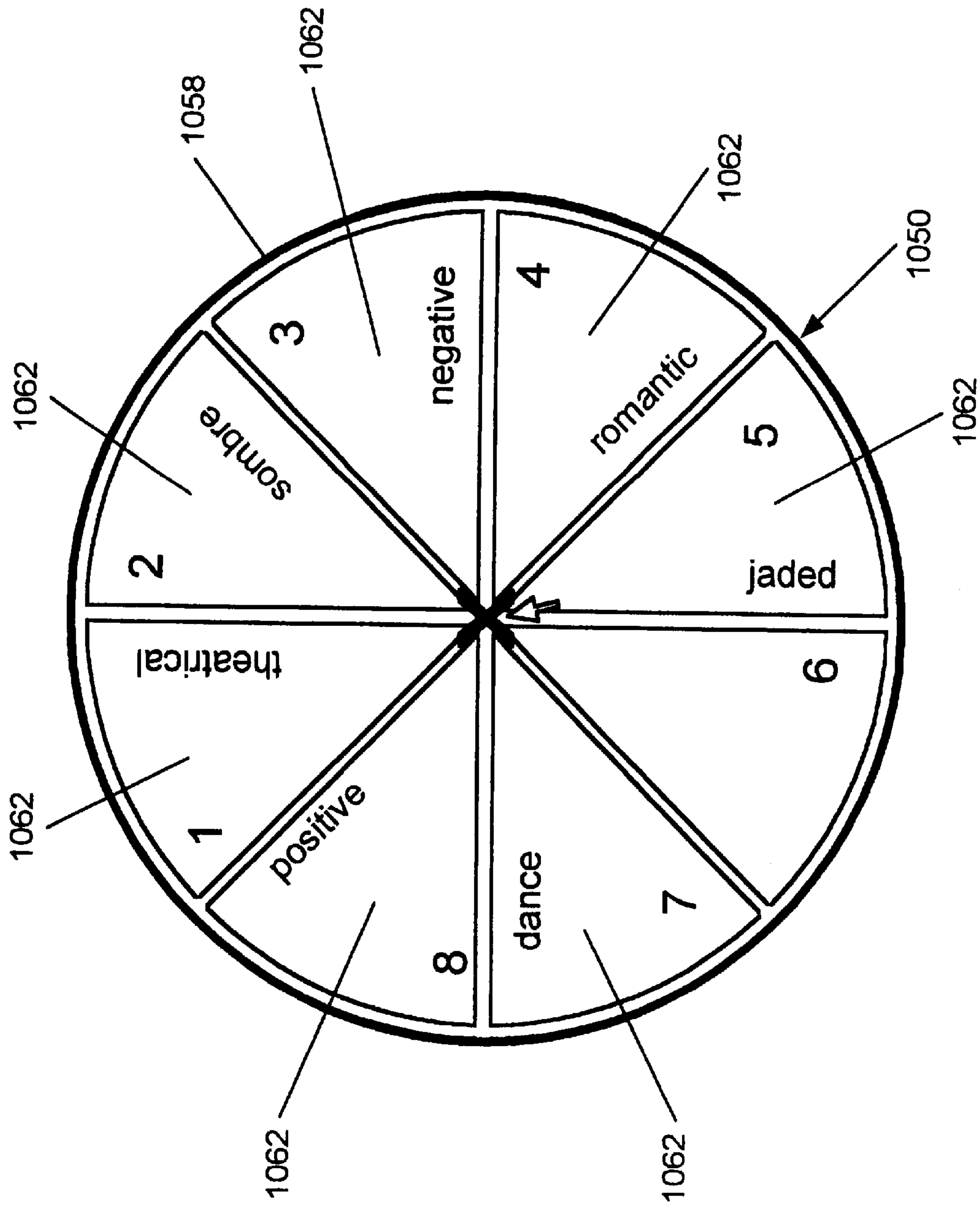
FIG. 10*b* is a screen shot illustrating a second view of the gesture wheel interface.

FIG. 10*a* illustrates the gesture wheel interface 1050, a graphical interface for selecting a desired gesture to correspond to the behavioral information the user 100 is attempting to convey. In FIG. 10*a,* the interface 1050 is shown as two wheels but any two concentric geometric shapes can be used. Upon invoking the gesture wheel interface 1050 by selecting the gesture button 244, the user's cursor is placed in the center of the wheel 1054, as shown in FIG. 10*b*. The inner wheel 1058 is divided into sections 1062 for the classes of gestures available. The outer wheel 1066 is blank at this point in the selection process. Moving the cursor outward through a section 1062 of the inner wheel 1058 identifies the class of gesture desired (e.g., Romantic versus Somber). Once the gesture class has been determined, the outer wheel 1066 displays the specific gestures contained in that class as shown in FIG. 10*a*. Moving the cursor around the outer wheel 1066 and selecting a specific gesture indicates a selection of that gesture, resulting in the placing of an appropriate control marker into the outgoing chat edit box 212. Moving the cursor outside the outer wheel 1066 (with or without clicking) closes the gesture wheel interface 1050.

Figure 10C:
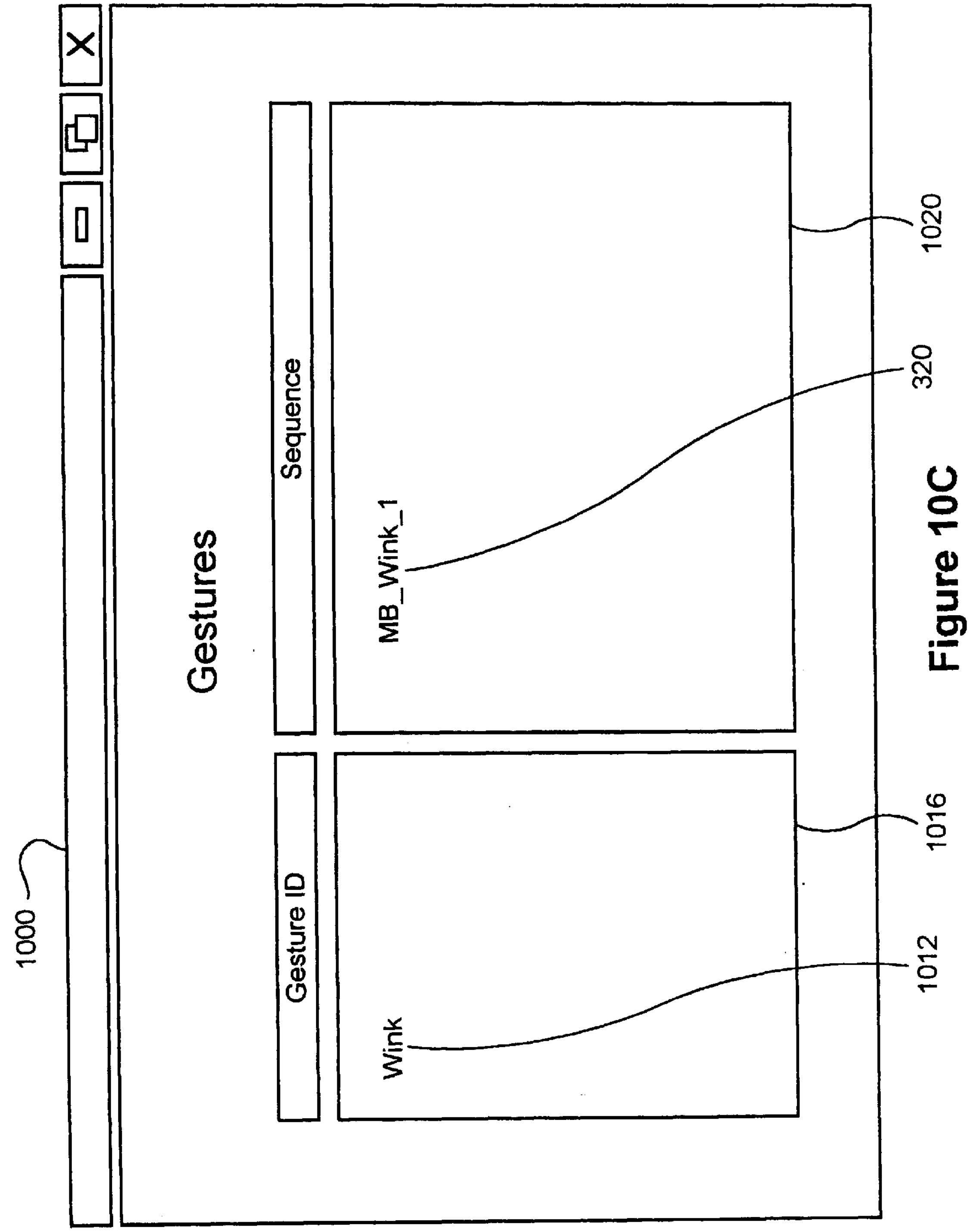
FIG. 10*c* is a screen shot illustrating an embodiment of a gesture setting interface.

FIG. 10*c* illustrates a gesture definition interface 1000 used to create gestures by the application developers. Gestures may be predefined; alternatively, the user may define the gestures. A gesture is a specific type of behavioral movement 320 that communicates or punctuates a communication. Gestures run the gamut from waving to bowing to shaking a fist. Gestures are preferably organized into the following classes 1004: Romantic, Jaded (cynical or sarcastic), Dance, Positive (happy), Theatrical, Somber, and Negative (angry). Each gesture class 1004 has approximately a class of 8 specific behavioral movements 320 associated to it, which can be individually selected or selected by the application module 120 responsive to the user's personality selection. The classes are used to descriptively categorize the gestures for the user, to allow the user to make an easy and intuitive selection of a gesture in the gesture wheel 1050.

In one embodiment, content of a user's text string is analyzed to generate gestures. In this embodiment, words in the text string are analyzed to determine if predefined gesture trigger words are within the text string. Predefined gesture trigger words are descriptive action words that a user may or may not know are associated with a gesture behavioral movement. For example, if the user types in the words "wink" or "bow," the present invention recognizes the word and then executes the responsive behavioral movement 320. In a further embodiment, the selection of which behavioral movement 320 to execute is made responsive to the user's selection of behavioral characteristics.

In a preferred embodiment, gestures are given labels, called gesture IDs 1012. In one embodiment, the user 100 can insert a gesture 1012 to be performed by his or her visual representation 232 at any time during a communication session. The gesture behavioral movements 320 are preferably predefined, however, in an alternate embodiment, the user 100 is given the tools required to create custom behavioral movement gesture animation sequences. FIG. 10*c* shows a gesture ID 1012 linked to a behavioral movement 320.

As shown in FIG. 2*a,* the text edit box 212 located at the bottom of the chat display buffer allows the user 100 to input dialogue. Hitting <return> transmits the utterance (i.e., initiates the sending of a data communication to recipient). The utterance displayed in the edit box 212 is a combination of dialogue typed in by the user 100, gesture commands, and personality and/or mood intensity overrides. A user issues a gesture command by placing a gesture identification 1012 in the outgoing chat edit box. Once entered, the gesture identification 1012 is sent along with any dialogue (or other gestures or behavioral information, as discussed below) already present in the edit box. Upon reception, the recipient's computer 108 translates the gesture identification 1012 into a gesture behavioral movement 320, and the gesture behavioral movement 320 is executed by the user's visual representation 232 on the recipient's computer 108(2).

In one embodiment, the user does not have to know the gesture identification marker 1012 to identify a gesture. In this embodiment, the user 100 types '^' or a similar arbitrary symbol into the edit box. This signals that what is typed next is to be processed as a gesture. The user 100 then types the name 1012 of a gesture. As the user 100 types characters after the '^', pattern matching is performed to identify the complete gesture name 1012. The pattern matching uses a conventional technique such as regular expressions known to those of ordinary skill in the art. Once a gesture name 1012 has been inputted, the typed characters are converted to identify the appropriate gesture behavioral movement 320. Alternatively, hotkeys can be used to identify a gesture to be communicated to a recipient 100(2).

To create the sequence of movements 320 which form a gesture, the gesture definition interface 1000 is accessed. A gesture editing panel 1016 is displayed that contains a gesture ID 1012 and a list box 1020 of behavioral movements 320. The list box 1020 displays behavioral movements 320 that are linked to the gesture IDs 1012. To correlate a new movement 320 to a gesture 1012, the sequence field of the list box 1020 is selected (whether blank or already filled with data). This generates a pop-up menu of available behavioral movements 320. Selecting an entry in the menu list links the movement 320 to the gesture identification 1012.

Figure 11A:
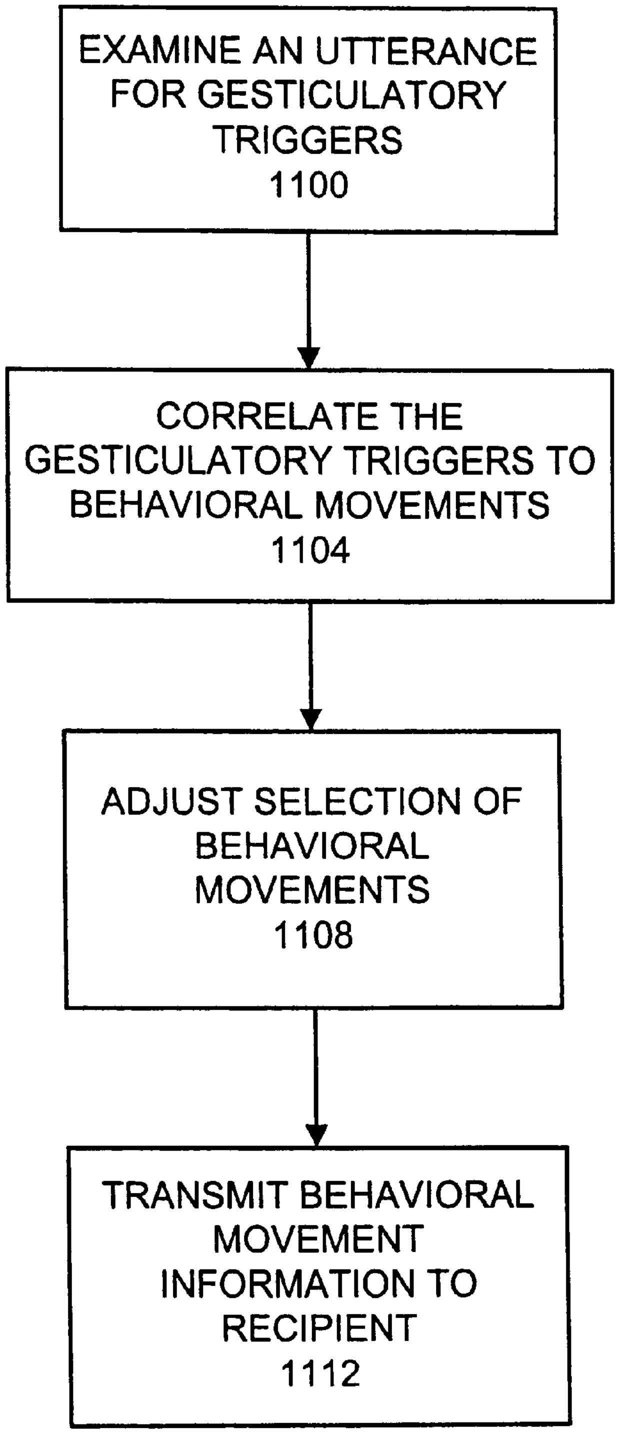
FIG. 11*a* is a flow chart illustrating a natural language processing.

FIG. 11*a* is a flow chart illustrating natural language processing in accordance with the present invention. In this embodiment, the contents of the data communication are analyzed to generate appropriate behavioral movements 320 for the user's visual representation 232. Therefore, in accordance with the present invention, visual representations 232 are sensitive to the semantic content imbedded in users' utterances, as their body language and gesticulations reflect what is said in the general flow of the communication session. These behavioral movements 320 are implicitly generated, through analysis of the content of a data communication, in contrast to explicitly generated behavioral movements 320 which are created in response to gesture commands. However, the behavioral movements 320 generated through natural language processing are still selected responsive to mood and personality choices of the user.

In this embodiment, the application module examines 1100 an utterance for gesticulatory triggers, correlates 1104 the gesticulatory triggers to behavioral movements 320, adjusts 1108 selection of behavioral movements 320 responsive to hierarchical personality-based phrasal considerations, and then transmits 1112 resultant behavioral movement information as part of a choreography sequence to the recipient(s) 100(2) in the place of behavioral information generated from a personality type and mood selection alone. For example, without natural language processing, a visual representation 232 will be acting during communication sessions in listening and fidgeting states responsive to behavioral movements 320 associated with the user's selected behavioral characteristics. Specific gestures are generated also responsive to selected behavioral characteristics. However, with natural language processing, the text of the communication is analyzed, and specific behavioral movements related to the content of the text are generated, also responsive to the selected behavioral characteristics. For example, if an ejective, such as "Wow" is part of a communication, the present invention generates a behavioral movement 320 appropriate for the phrase "Wow" and also appropriate for the personality and mood settings of the user. For example, if a user has selected an upperclass personality, the "Wow" is accompanied by a reserved facial expression, with a slight lift of the eyebrows. If the user has selected a rocker personality, the "Wow" is accompanied by head swaying, a goofy grin, and other facial and body attributes appropriate to the personality choice.

More specifically, to process a data communication for behavioral information, rules are used to quantify language content in a data communication. The rules are then associated with personality files 800. Upon determining that a word in a text communication belongs to a gesticulatory trigger class, the application module looks at the personality file 800 selected by the user for the visual representation 232 to determine which rule to apply to animate the user's visual representation 232. A gesticulatory trigger is a class of word which provokes a behavioral movement 320. In the example given below, gesticulatory triggers include prepositions, referents, ejectives, and other grammar objects which can be related to a specific facial or body movement.

The rules adhere to the following grammar:

A rule is defined as a weighting, a context, and an associated behavioral movement 320: Rule:=<weighting>*<context>*

A context is defined as a gesticulatory trigger which is a grammar sub-category, e.g., <context>:=<gesticulatory trigger>* [<gesticulatory trigger>]

A gesticulatory trigger is any useful sub-category of grammar, e.g., <gesticulatory trigger>:=Preposition|Ejective|Count Noun|Volumetric|Egocentricity |Xenocentricity|Negative|Positive|Referent|Specific*

The "*" symbol allows any amount of unrelated text to be placed after the gesticulatory trigger.

The weighting of the rule is the propensity of the visual representation 232 to perform an animation, e.g., <weighting>:=numeric value representing propensity to perform in the range 0 (never)–10 (all the time). These weightings are similar to the weighting by personality and mood settings for behavioral movements 320, as described above.

Some specific contexts are defined below:

Preposition:=any preposition

Ejective:=exclamatory words or phrases (e.g., "Wow")

Count Noun:=quantities (e.g., "Two" or "Three")

Volumetric:=volume indicators (e.g., "Tons" or "Huge" or "Very")

Egocentricity:=references to self (e.g., "I" or "Me" or "Mine")

Xenocentricity:=references to others (e.g., "You" or "They")

Negative:=denouncements (e.g., "No" or "Not")

Positive affirmations:=(e.g., "Yes")

Referent concept referents:=(e.g., "This" or "That")

Specific:=any word or phrase delimited by quotes

Accordingly, the application module analyzes an utterance to quantify and qualify gesticulatory triggers, and then translates the triggers into behavioral movements 320 utilizing the rule mappings. For example, for the rule mapping:

10*Referent*ANIM_POINT_UPWARD the rule indicates that the associated visual representation 232 always (due to a high weighting of 10) points upward (plays the point upward animation or behavioral movement 320) when words such as "this" or "that"(referent gesticulatory triggers) are encountered in utterances. As the <context> rule is recursive, any gesticulatory trigger can be described in relation to any other trigger. Multiple rules are associated with each trigger, the selection of which rule and behavioral movement 320 to use is determined based on the selected behavioral characteristics. For example, for a positive gesticulatory trigger, a variety of positive behavioral movements are available to be animated; however, a behavioral movement that expresses the user's personality type 328 is the one selected to be animated when a positive is recognized in the utterance.

Figure 11B:
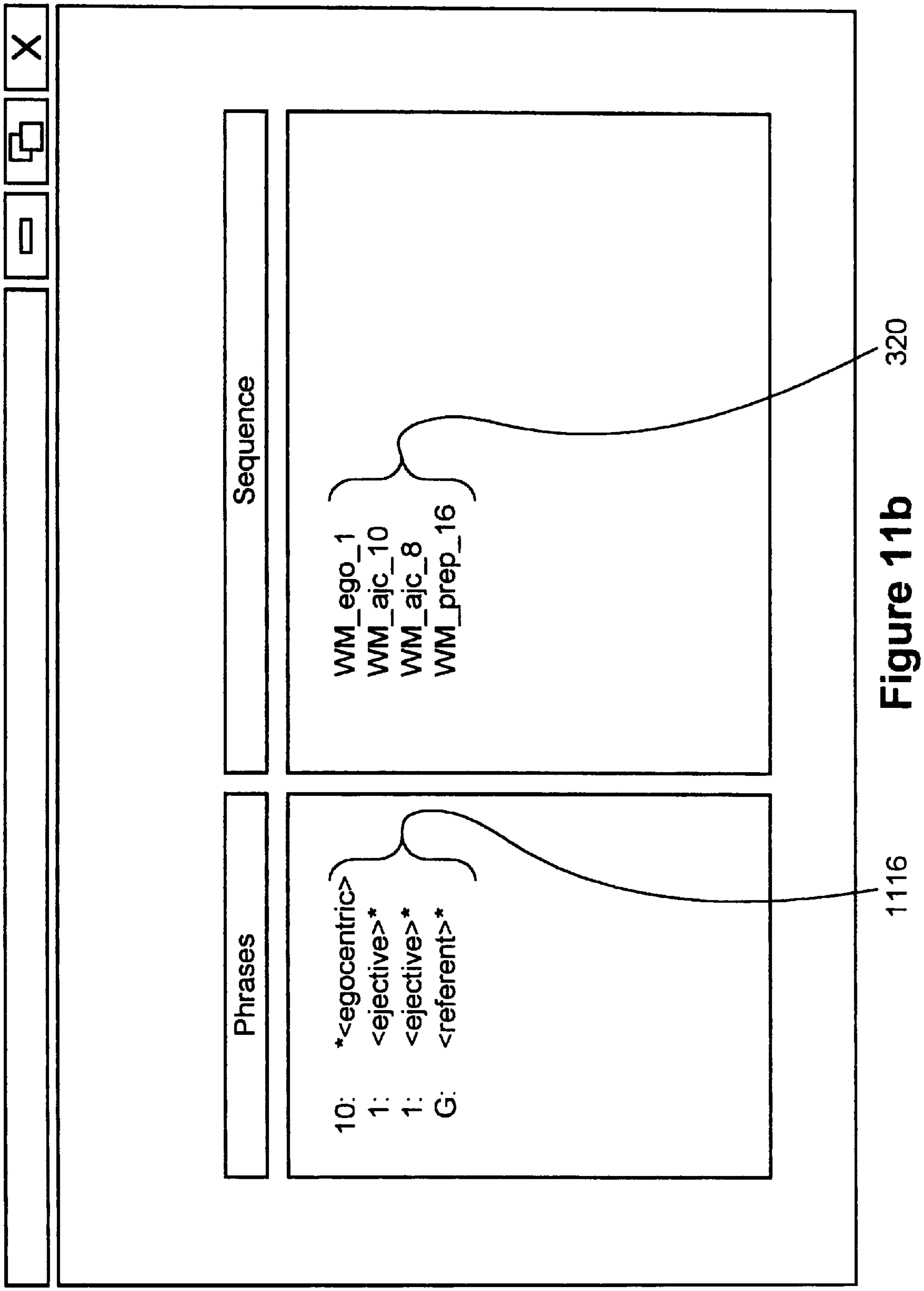
FIG. 11*b* is a flow chart illustrating processing predefined phrases in accordance with the present invention.

In addition to rule mappings, each personality type 328 has a lexicon 816 associated to it. The lexicon 816, as discussed with FIG. 8, is a list of words linked to the personality type 328, each with a feature set (i.e., a list of gesticulatory trigger types—Preposition, Ejective, etc.,—that apply to it). The lexicon 816 is used to recognize words in a text string, by comparing words in the text string to the lexicon 816. When a word is recognized, the associated gesticulatory trigger is known and can then be used to execute the rules associated with the gesticulatory trigger. FIG. 11*b* illustrates an embodiment of predefined phrase processing. Responsive to a phrase being recognized as belonging to a gesticulatory trigger class for a particular personality type 328, for example, "egocentric," the associated rule 1116 for the class is used to execute the associated behavioral movement 320. In this example, if "I" is typed, the rule 10:*<egocentric> is invoked, and the associated behavioral movement "wm_ego_1" is executed (in this case, because of the high '10' weighting, the movement 320 will always be executed.)

Figure 12A:
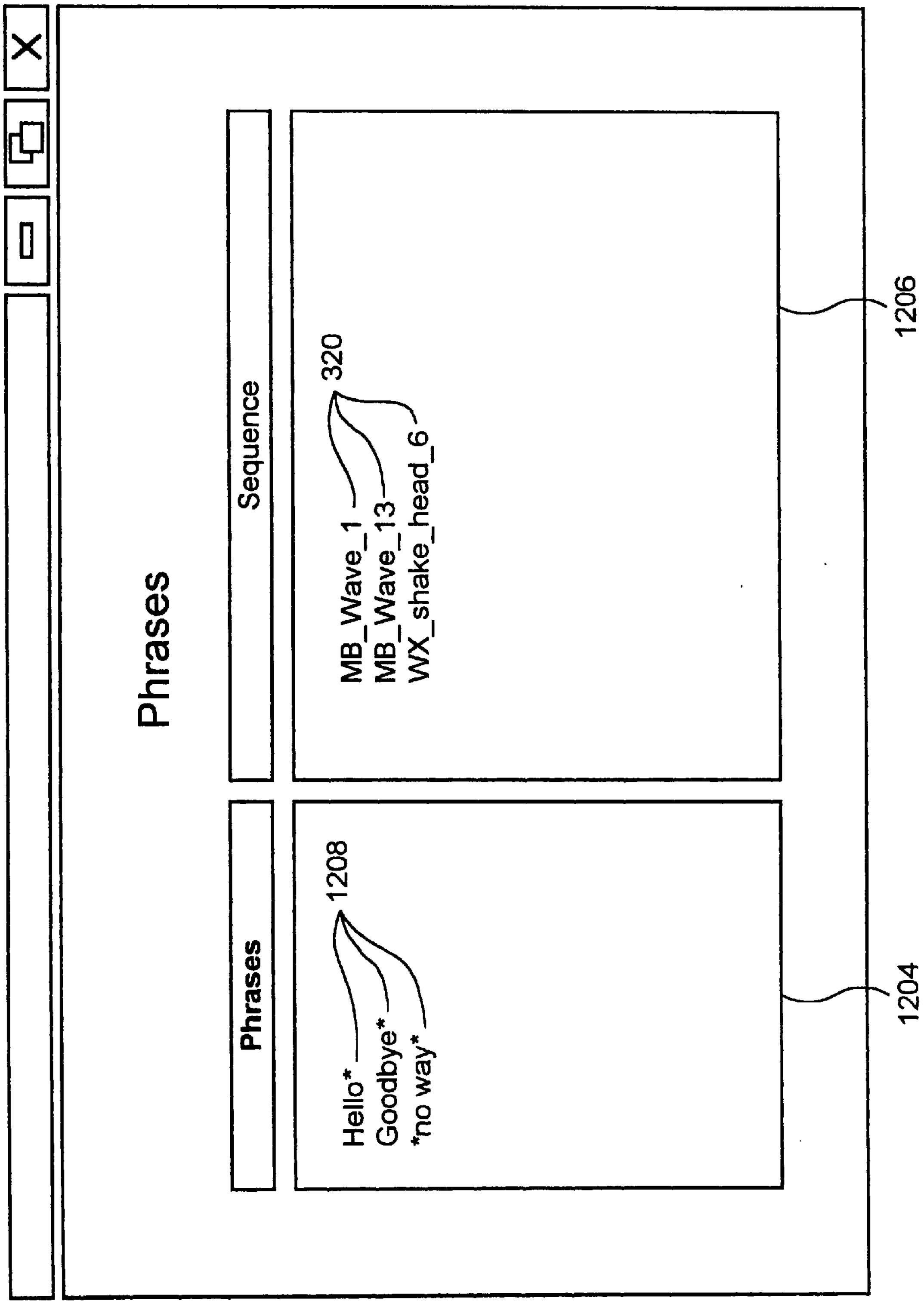
FIG. 12*a* is a screen shot illustrating an alternate embodiment of a predefined phrase editor interface.

FIG. 12*a* illustrates an alternate embodiment with a predefined phrase editor 1200 in accordance with the present invention. In this embodiment, the present invention controls the behavioral movement 320 of a visual representation 232 after parsing a text portion of an utterance to identify predefined phrases contained within the utterance. A list box 1204 is displayed in which the phrase entries 1208 of the list box 1204 are linked to behavioral movements 320. A parser processes users' typed dialogue (chat text) during a communication session for these phrases and upon identification of a predefined phrase, the associated behavioral movement 320 is initiated. For example, if the "sounds good" phrase is predefined and entered by a sender, upon recognition, the visual representation 232 animates one of the associate behavioral movements 320 with that phrase, for example, by making an "OK" symbol with his hand. Or, as shown in FIG. 12*a,* if the "no way" phrase is entered, the visual representation 232 shakes its head. The list box 1204 is preset with a standard set of phrases 1208 which each personality 328 can respond to. In a preferred embodiment, the list of phrases 1208 is different for each personality type 328, and are selected to evoke to a recipient the sense of the selected personality.

To add a new phrase 1208, a blank phrase field is selected, and then the user 100 enters the desired phrase. This produces a pop-up menu of available behavioral movements 320, and selecting an entry in the menu links the behavioral movement 320 to the phrase 1208.

Figure 12B:
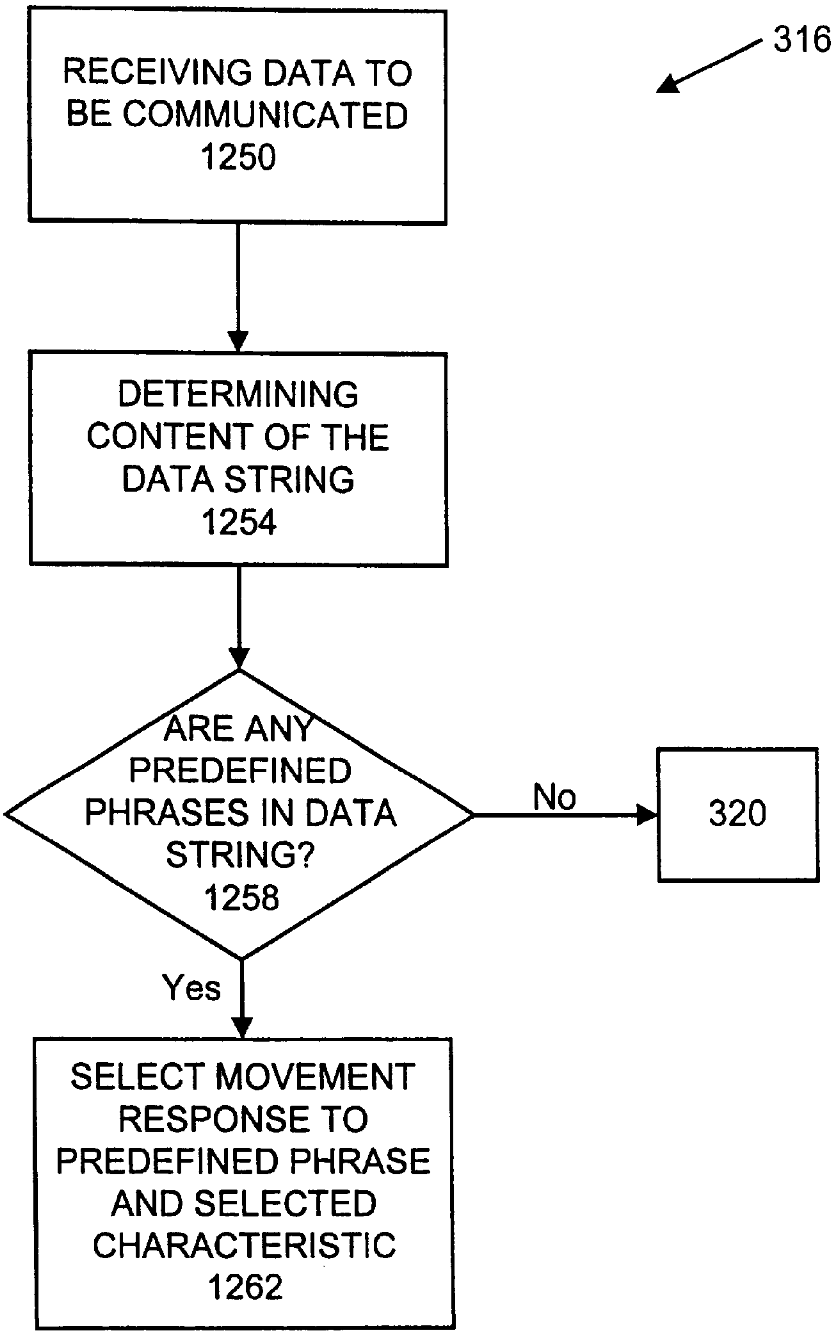
FIG. 12*b* is a flow chart illustrating an alternate embodiment of processing of predefined phrases.

FIG. 12*b* is a flow chart illustrating processing predefined phrases in accordance with the present invention. First, the application module receives 1250 data to be communicated. The data is analyzed 1254 to determine the content of the data string. More specifically, the application module determines 1258 whether any predefined phrases are present in the data string by comparing the words in the data string to a list of phrases associated with the selected personality. If there are predefined phrases within the data string, the application module selects 1262 a behavioral movement or movements that are linked to the identified predefined phrase.

Figure 13:
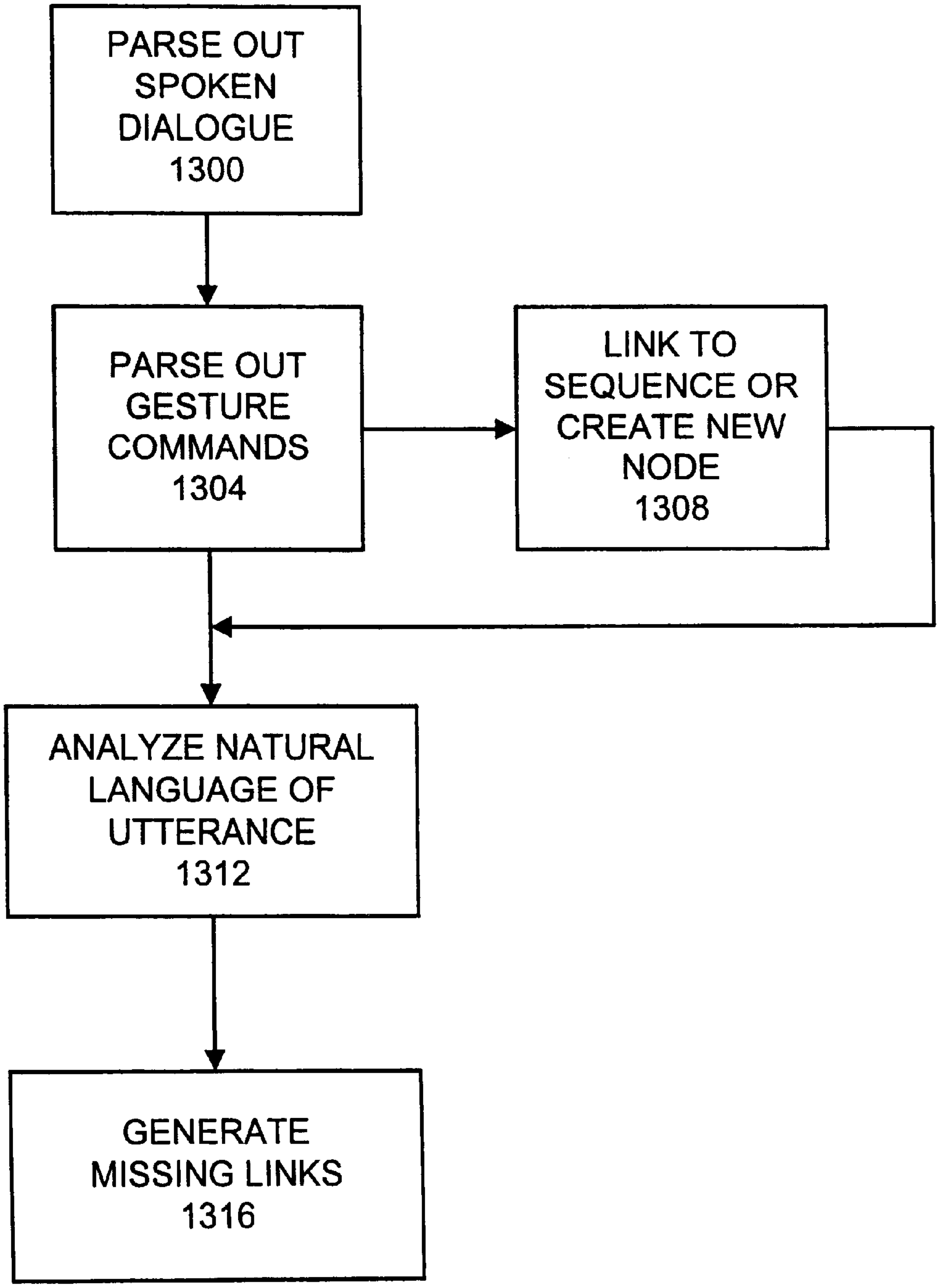
FIG. 13 is a flow chart illustrating the processing of a data communication.

FIG. 13 is a flow chart illustrating the processing of an utterance to generate a choreography sequence that accompanies an utterance, when a data communication is to be transmitted to other users 100. First, the application module parses 1300 out 'spoken' dialogue elements into a time coded choreography sequence base. The choreography sequence comprises a sequence of choreography sequence nodes, where each node represents a behavioral movement. Next, the application module parses 1304 the data string for gesture commands. Any gesture commands found are linked 1308 either to existing choreography sequence nodes or to entirely new nodes as needed. Then, the content of the data communication is analyzed 1312 using the natural language processing described above to generate control markers linked to appropriate choreography sequence nodes. Finally, any gaps in the choreography sequence are filled by generating 1316 behavioral movements 320 determined by the selected behavioral characteristics, either the preselected personality and/or mood intensity settings, or using the personality or mood intensity override settings, as described above.

The following are example utterances which may be received from a user 100 in accordance with the present invention:

| | |
|---|---|
| "Hello, how are you?" | (simple text input) |
| "Hello, how are you? (wink)" | (text with a gesture identifier 1012) |
| "(flamboyant) Hello, how are you?" | (text with a personality override) |
| "(100) Hello, how are you?" | (text with a mood intensity override) |
| "(flamboyant)(100) Hello (wink), how are you?" | (text with a gesture identifier and personality and mood intensity overrides) |

Figure 14A:
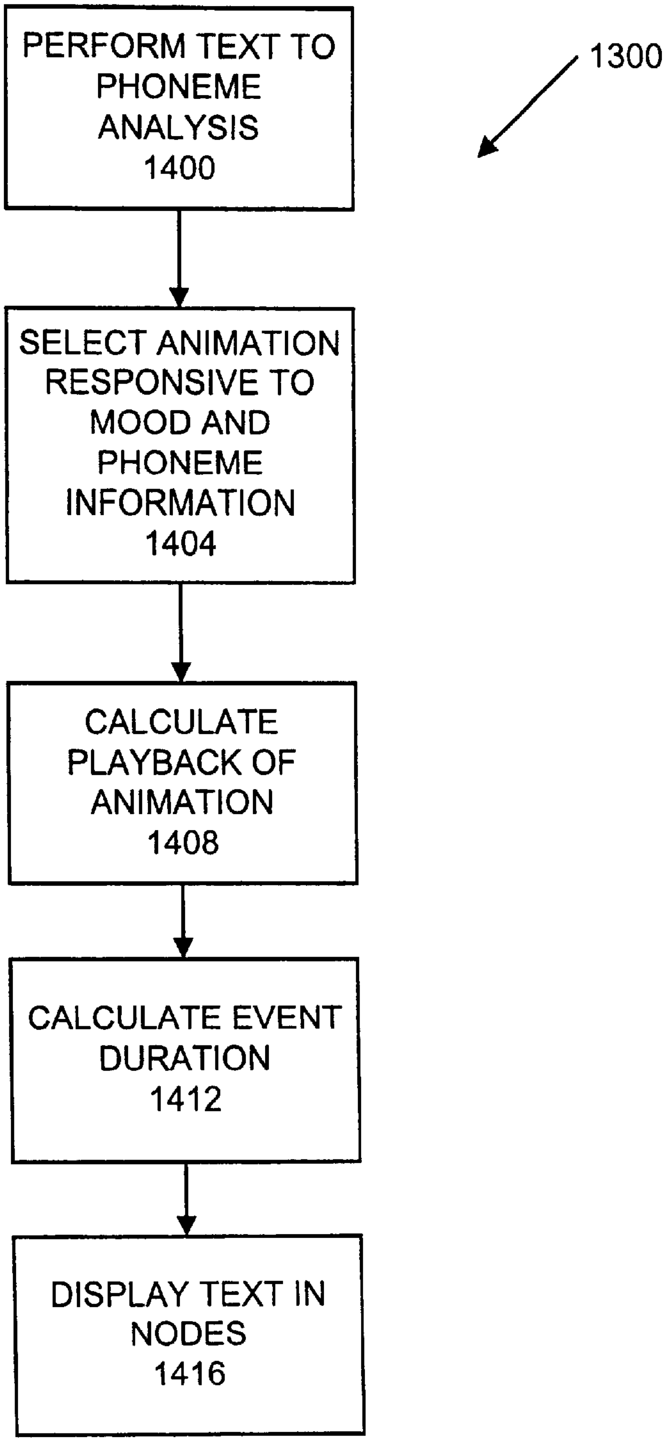
FIG. 14*a* is a flow chart illustrating generating a choreography sequence in more detail.

FIG. 14*a* is a flow chart illustrating developing a choreography sequence in more detail. The choreography sequence 1480 is essentially a linked list of time coded events. As shown in FIG. 14*b,* each of the nodes 1480 in the list has the following components:

Text (dialogue) to be displayed during the event 1454

Facial Animation ID 1458

Speed of Facial Animation Playback 1462

Iterations of Facial Animation Playback 1466

Body Animation ID 1470

Speed of Body Animation Playback 1474

Iterations of Body Animation Playback 1478

Duration (in milliseconds) of the event 1482

A link 1486 to the next node (event) in the choreography sequence

Figure 14C:
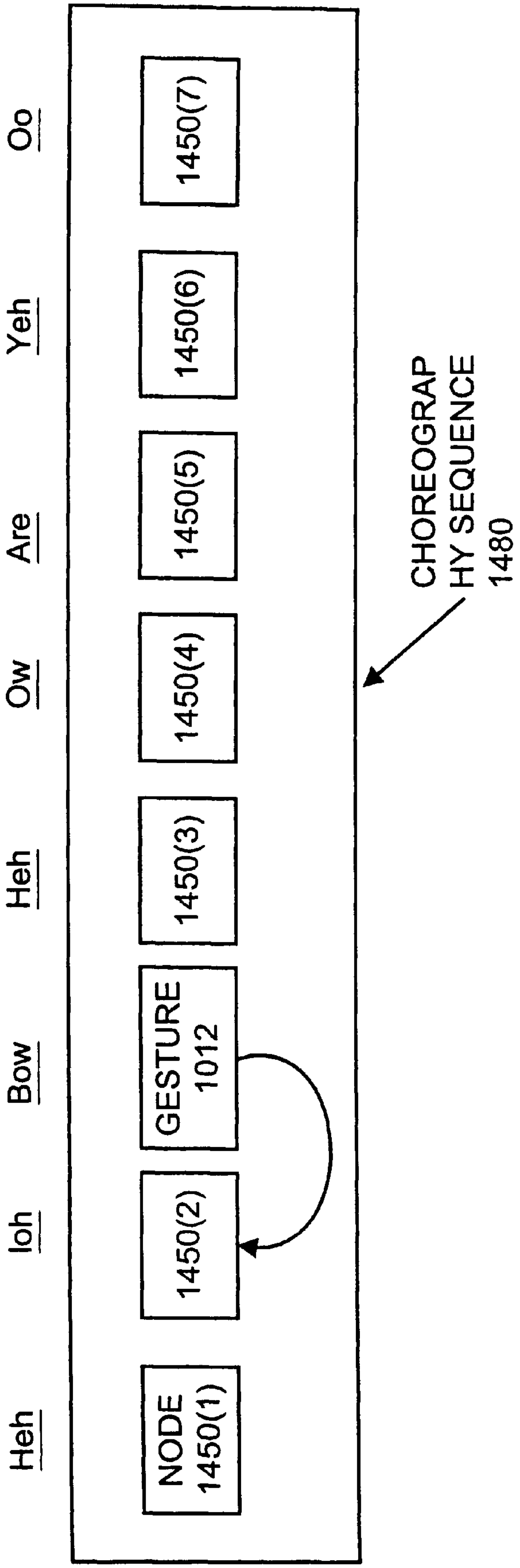
FIG. 14*c* is a block diagram of a choreograph sequence.

First, the application module performs 1400 a text-to-phoneme and punctuation analysis of the utterance to generate nodes 1450. Given the example dialogue "Hello, how are you", as shown in FIG. 14*c* this would result in 7 nodes 1450 being created as the base choreography sequence 1480 (one for each of 'heh', 'loh', 'heh', 'ow', 'are', 'yeh', 'oo'). Once created, the nodes 1450 are completed as follows:

Referring back to FIG. 14*a,* facial and body articulatory behavioral movements 320 are chosen 1404 for each node 1450 and their IDs fill their respective data slots 1458, 1470 of the node 1450. The body movements 320 are selected from a generic pool or set of movements 320 used by all visual representations 232 responsive to selected behavioral characteristics. The facial movements 320 are selected from this pool using phonemic and personality 328 criteria, with the goal of having the behavioral movement 320 approximate the node's phonemic quality (e.g., 'oh' versus 'ee' versus 'buh', etc.) while being responsive to the selected personality type 328. Next, the appropriate facial and body movements 320 are selected responsive to the selected mood intensity 336. The mood intensity 336 is derived from either the visual representation default setting or, if present, a mood intensity override. In a preferred embodiment, sets 332 of each is phonemic facial movements and body behavioral movements 320 are stored for each visual representation 232 as determined by the personality type 328. In one embodiment, 21 behavioral movements 320 per set are stored, representing the range of mood intensities from −100 to 100 in steps of 10, and the behavioral movements 320 from within the set are selected based on the mood intensity 336 selected. The selected mood intensity 336 provides weights to the behavioral movements 320, and the application module selects a behavioral movement 320 responsive to its weights.

Then, a facial and/or body behavioral movement playback rate is calculated 1408 for each event, responsive to the base rate of playback inherent in each behavioral movement 320 and any adjustments caused by the selected behavioral characteristics, as is discussed above in connection with FIG. 4*b*. For example, the mood intensity 336 can be designated to effect the rate of playback (the more intense the speaker, the more quickly the text is delivered and behavioral movements 320 animated). This information used to fill the speed of playback components 1462, 1474 of the node 1450. Event durations are then calculated 1412 for each event, responsive to the base playback time inherent in each behavioral movements and any adjustments caused by the selected behavioral characteristics and is used to fill the duration component 1482 of the node 1450. In the first example described above, the comma after 'Hello' implies a pause lengthening the duration of the event (i.e., the start of the next event). Nodes 1450 also comprise iteration information which is obtained from the identified behavioral movement files. The iteration information controls the number of times a behavioral movement 320 is played when called. This allows very small files to be stored for animations requiring repetitive motion. For example, if the visual representation 233 is playing with a yo-yo, a single behavioral movement file comprises a single up-and-down motion. To have the visual representation 232 "play" with the yo-yo, the iteration control is set to have the visual representation 232 animate the up-and-down motion a number of times.

Text to be displayed is entered 1416 in the appropriate component 1454 of the node 1450. This is performed on a word by word basis, in contrast to a phoneme by phoneme basis. Therefore, while some words (e.g., 'table') in an utterance produce more than one node 1450, the entire orthography is represented at once with the first node 1450. Once a next node is created, the link 1486 component is written with the information regarding the location in memory of the next node 1450.

Figure 15:
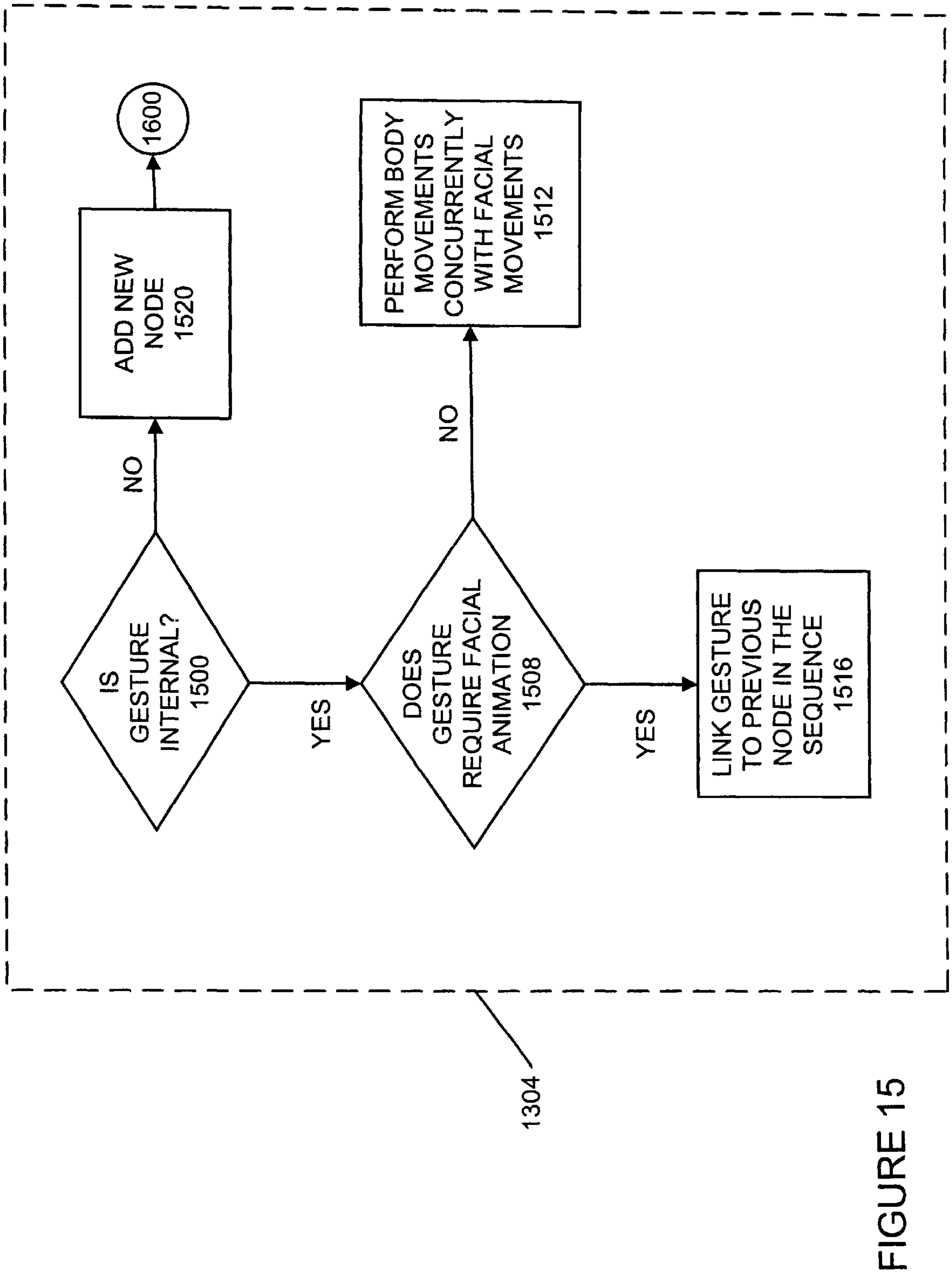
FIG. 15 is a flow chart illustrating parsing out gesture commands in more detail.

FIG. 15 is a flow chart illustrating parsing out gesture commands block 1304 in more detail. First, the application module 120 determines 1500 how the gesture is presented in the data communication. If the application module 120 determines that the gesture command is independent of the rest of the data in the data communication, the application module 120 does not consider 1504 the interaction between the behavioral movements 320 specified by the gesture and the behavioral movements 320 dictated by the text in creating the choreography sequence 1480. If the application module 120 determines 1508 that the gesture is an internal gesture, i.e., text occurs after the gesture, the application module 120 determines 1508 whether the gesture requires facial movements 320. If the gesture does not require facial movements 320, the application module specifies 1512 that the body movements 320 are to be performed concurrently with the facial movements 320 specified by the text. If the application module determines that the gesture does require facial movements, (e.g., laughing), the gesture is linked 1516 to the previous node in the choreography sequence 1480. Thus, on execution the choreography sequence 1480 is paused upon reaching this node 1450, the behavioral movement 1450 dictated by the gesture is executed, and then the choreography sequence 1480 is resumed. For example, as shown in FIG. 14*b* given the data communication "hello (bow), how are you?", which does not require facial movement, the gesture (bow) 1012 is associated to the previous node 1450(2) established for the phoneme "lo"), and the 'bow' movement 320 is performed concurrent with the animation of the hello phrase. In contrast, given the utterance "Why, hello (laugh), how are you?," which requires facial movement, a node 1450 for the gesture (laugh) is inserted between the last node 1450 for the word "hello" and the first node 1450 for the word "how," and the visual representation 232 pauses after animating the word hello and animates a laugh.

If the application module determines that the gesture is a terminal command, and thus the data communication does not have text positioned after the gesture, a new node 1450 is added 1520 to the choreography sequence 1480. Upon execution, when reaching this node 1450, the behavioral movement dictated by the gesture is executed. For example, for the phase "Hello, how are you?(wink)," a node is added for the wink gesture after displaying "you."

The gesture data are entered into the selected (or newly created) nodes 1450 as body and facial movements 320. Links to behavioral movement files to support the body and facial movements are obtained responsive to the personality type 328 for the selected personality.

Figure 16:
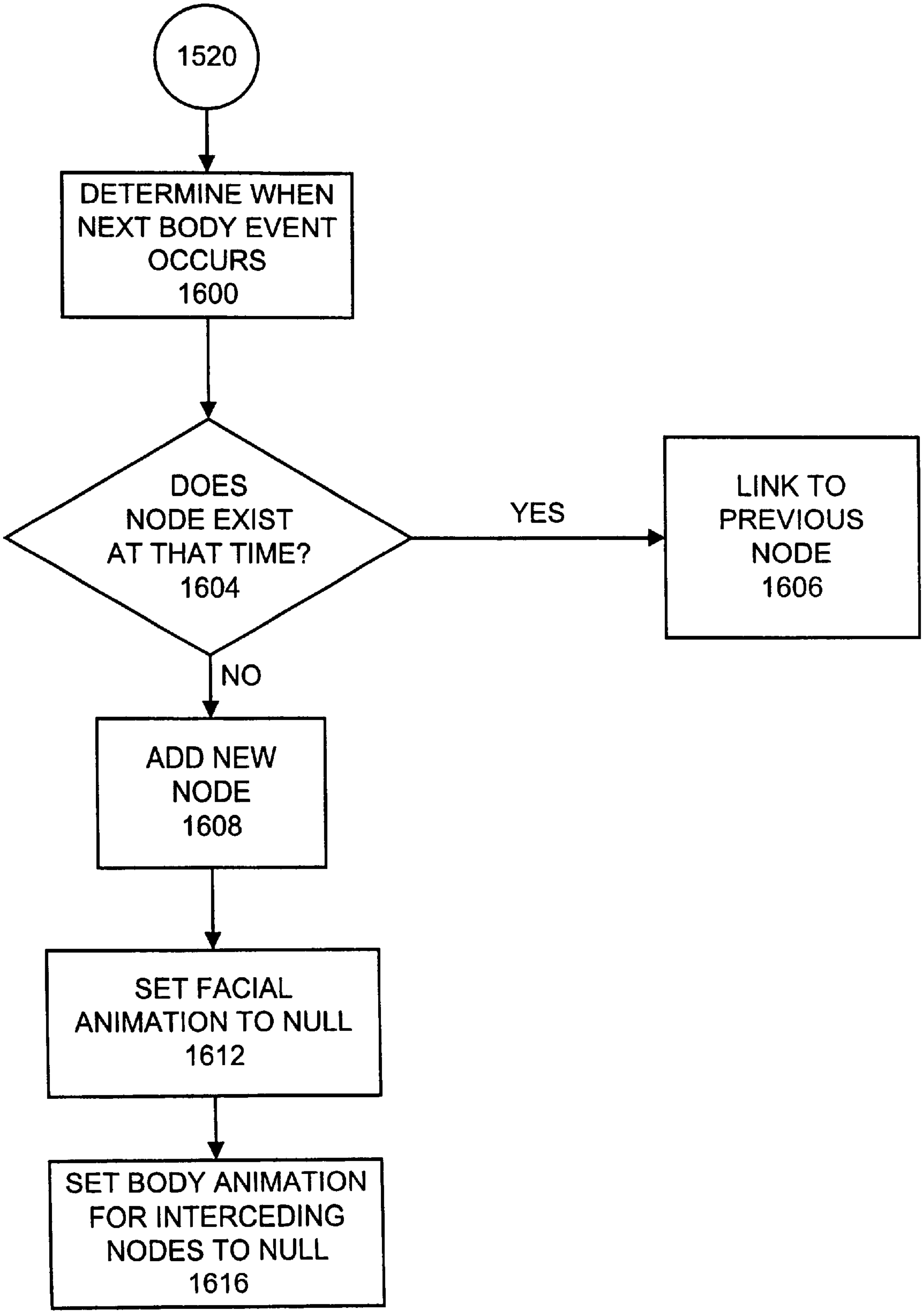
FIG. 16 is a flow chart illustrating adding nodes to a choreography sequence in more detail.

Next, duration information is calculated for the gesture. For a terminal gesture, Is duration information is also calculated for the gestures from the identified animation sequence file 320 and is entered into the newly created node 1450. For internal gestures, as shown in FIG. 16, the application module determines 1600 when the next body behavioral movement 320 should be and determines 1604 whether a node 1450 exists for that time. If the application module determines 1604 that no choreography sequence node 1450 exists for that time, a new node 1450 is inserted 1608 into the list. If a node 1450 exists, the behavioral movement 320 is linked 1606 to that node by writing the gesture movement information to the existing node 1450. The facial animation fields are set 1612 to NULL if the new node 1450 is a body control point only (e.g., bowing). The insertion of a new node 1450 affects the duration of the next event (node) as well as the duration of the gesture's own node 1450. For example, if two nodes 1450 existed such that the first node 1450 had a duration of 1000 milliseconds before processing the second node 1450, and a third node 1450 was inserted ¾ of the way into this interval, then the first node's duration becomes 750 milliseconds and the (new) second node's duration becomes 250 milliseconds. For all interceding nodes 1450 (those between when the gesture starts and when a new body animation control can be attached), the body animation fields are set 1616 to NULL (since no controls may be associated while the gesture is in progress).

Figure 17A:
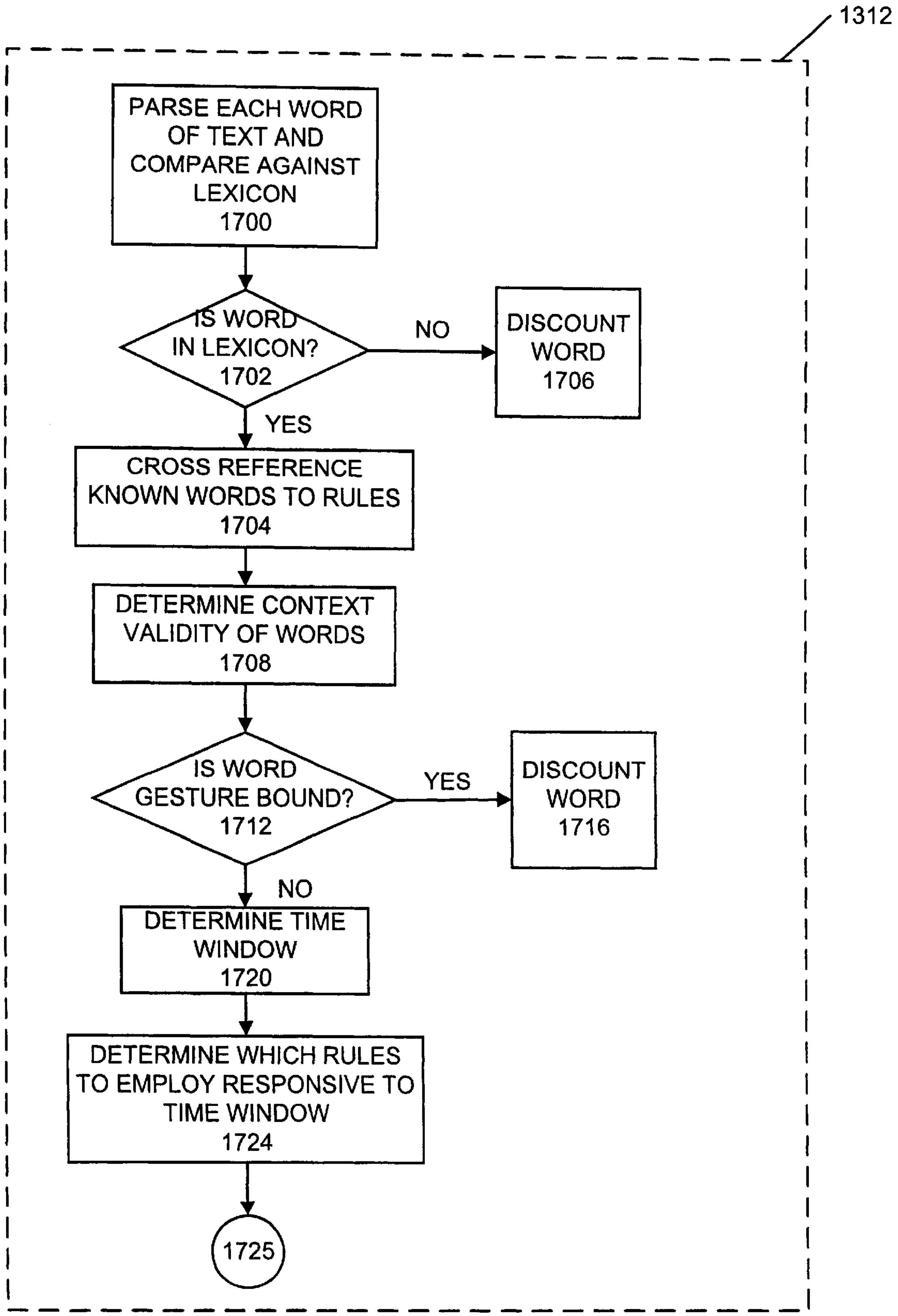
FIG. 17*a* is a flow chart illustrating analyzing the content of the data communication using natural language processing.

FIG. 17 is a flow chart illustrating a preferred embodiment of natural language processing block 1312 in which the content of the data communication is analyzed to create nodes 1450 for a choreography sequence 1480. First, as described above with respect to FIG. 11*a,* each word of text is parsed 1328 and compared against the personality's lexicon 816 to see if it is known. If the word is found 1702 in the lexicon 816, the known words are cross referenced 1704 to rules 1116 listed by the personality file 800. For example, if the data communication contained the word "you" and this word was entered in the personality's lexicon 816, then the feature set for the word (the list of trigger types that it represented) taken from the lexicon 816 is used to retrieve all the rule mappings 1116 that apply (in this case, all the rule associated with the Xenocentricity gesticulatory trigger). If the word is not found in the lexicon 816, the word is discarded 1706. Then, context validity is determined 1708 against the selected rule 1116 (i.e., ensure that the word matches the criteria stated in the rule). Then, the application module 120 determines 1712 whether or not known words are gesture bound. Gestures are explicitly requested by the user and as such, have a higher priority than behavioral movements 320 generated from natural language processing. Checking a gesture binding is merely a matter of reviewing the choreography sequence 1480 for body animation controls that exist during the delivery of the known word, as parsing the communication for gestures has, in the preferred embodiment, already been accomplished as described above. If a known word is gesture bound, the behavioral movement rules 1116 pertaining to the known words are discounted 1716.

Next, the application module 120 determines 1720 time window factors. This step involves correlating behavioral movement durations (given by the behavioral movement files 320 associated with each rule 1116) and the available time between when the movement 320 starts and the next known (body) movement 320 begins. For example, given an utterance of "Wow, thank (bow) you very much", the (bow) gesture will be processed to start with the first node 1450 associated to the word "thank". Although the word "Wow" is not gesture bound, there is only a finite amount of time before the (bow) gesture must be initiated. This means that any rule 1116 that is mapped to a movement 320 which is longer than that time window and is applicable to "Wow" must be discounted. To aid in the usability of behavioral movements 320, the playback rate of the behavioral movement 320 may be adjusted by as much as 33% to fit a time window. This process of assessing time windows further reduces the set of applicable known word rules 1116.

Figure 17B:
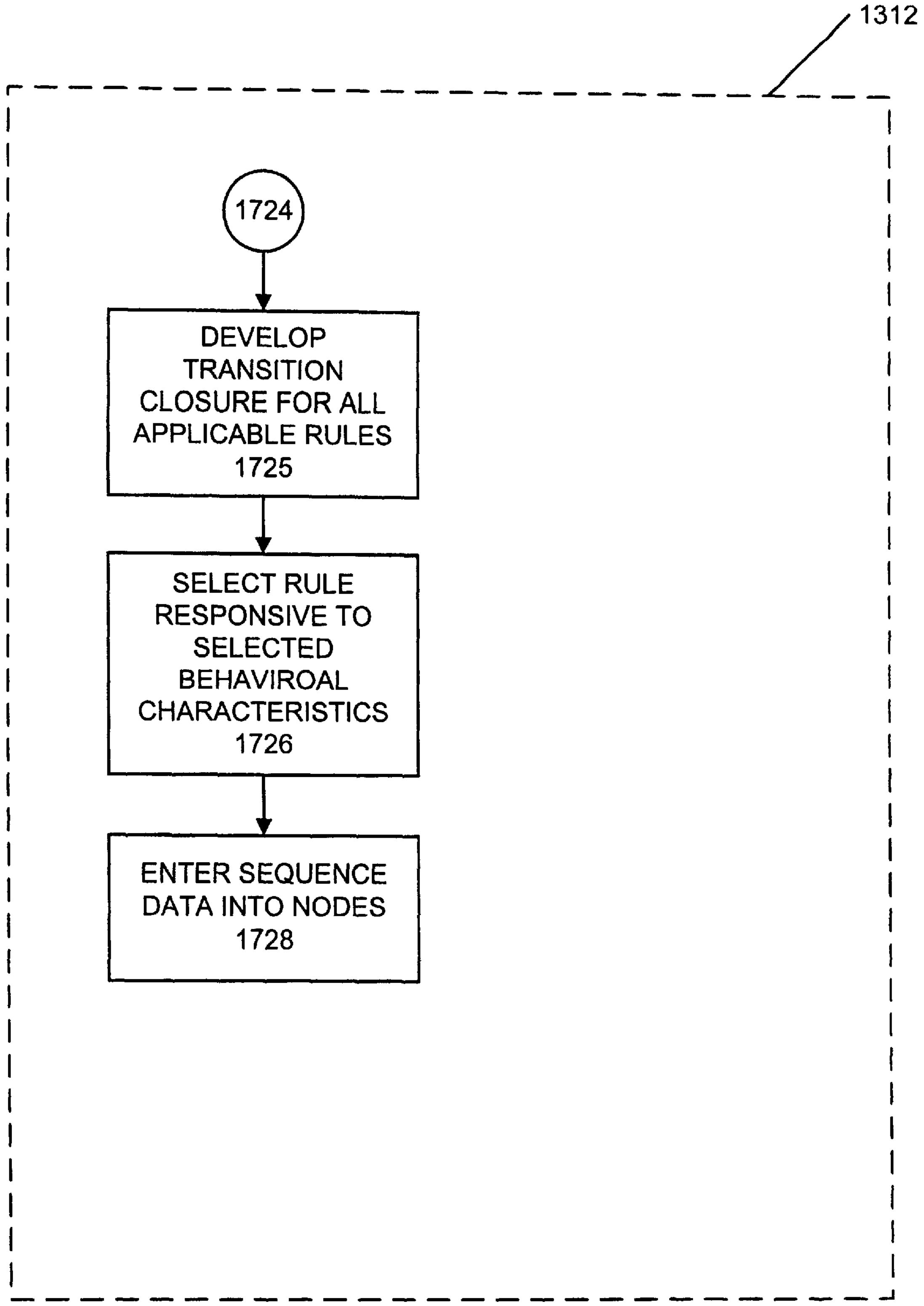
FIG. 17*b* is a continuation of the flow chart of FIG. 17*a*.

The application module 120 then determines 1724 which rule 1116 to employ. Preferably, the application module 120 calculates interaction effects of the word rules. This involves predetermining the effects on sequence binding and event time windows for each potential rule selection, since choosing one behavioral movement 320 might discount another because its start point would be bound or its required time window made unavailable. Doing this for all possible rule combinations produces 1725 the transitive closure, the set of all potential applications of the available rules 1116 to the utterance. As shown in FIG. 17*b,* calculations against the transitive closure are made 1726 using heuristics including weightings and mood intensities. Each rule 1116 has a weight, or propensity to happen, attached to it as determined by mood settings 336. Making calculations against these will tend to indicate one application of the rules 1116 over another. For example, if one application of the rules involved three behavioral movements 320, each with a weighting of 5, and another involved two movements 320, both with weightings of 8, then the second application would be indicated as more likely to happen. Once the rule application has been determined, the sequence information is incorporated into the choreography sequence 1480 as with gestures. Finally, the application module enters 1728 the behavioral movement information into the appropriate start nodes 1450 as body animation information.

Figure 18:
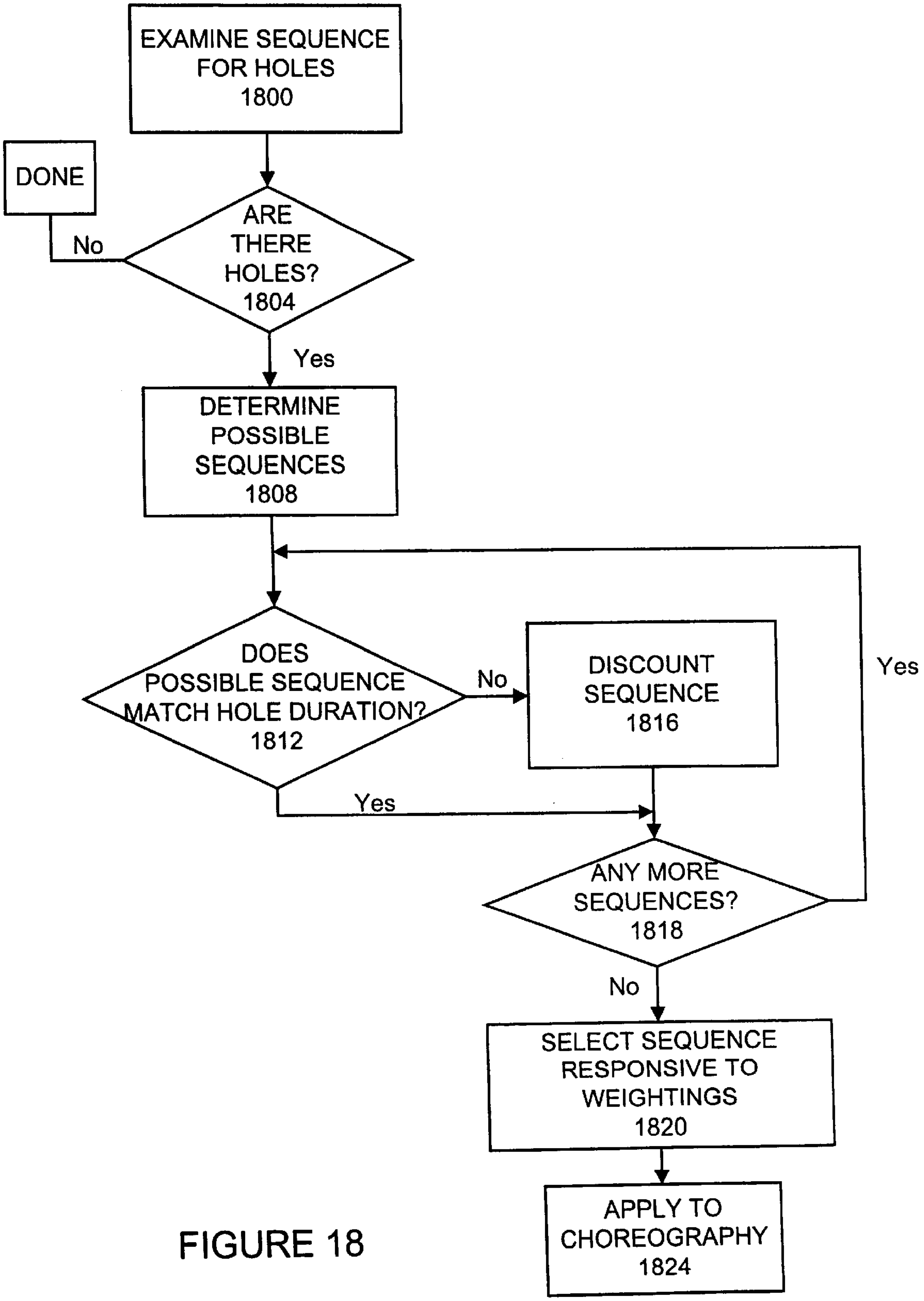
FIG. 18 is a flow chart illustrating generating behavioral movements to address any missing links in the choreography sequence.

FIG. 18 is a flow chart illustrating generating behavioral movements 320 to address any missing components in the choreography sequence 1480. At this point the choreography sequence 1480 may still have places where there is no body control (i.e., holes between gestures and behavioral movements 320 generated from natural language processing). The choreography sequence is 1480 therefore completed with generic behavioral movements 320 selected responsive to selected behavioral characteristics. The choreography sequence list 1480 is first examined 1800 for body control holes. If a hole is discovered 1804, then a pass through the personality data is made to determine 1808 which behavioral movements 320 are usable given the selected mood intensity value. In one embodiment, the set of behavioral movements 320 which are usable is limited to those behavioral movements 320 which are associated with the selected personality type 328. Durations of the behavioral movements 320 in this set are then assessed 1812 against the hole duration. Durations are determined from the base sequence duration contained in the sequence file and interpolated mood intensity effects on the playback rate. If a behavioral movement 320 does not fit within the hole time window, the movement 320 is discounted 1816. A behavioral movement 320 can be rate adjusted to create a fit; however, the rate cannot be adjusted too fast or too slow such that the integrity of the behavioral movement 320 is threatened.

After a behavioral movement 320 is assessed, the application module 120 determines 1818 whether there are remaining behavioral movements 320 to be assessed. If there are, a next behavioral movement 320 is selected and assessed until all possible movements 320 are assessed. Of the viable remaining behavioral movements 320, a behavioral movement 320 is selected 1820 to fill the hole responsive to the weightings of the behavioral movements 320. Alternatively, the behavioral movement 320 is selected randomly from the set of viable remaining behavioral movements 320. In one embodiment, the personality type 328 is linked to a set of behavioral movements 320, and a mood intensity setting 336 is linked to a set of behavioral movements 320 which correlate to that mood intensity 336. Upon selection of a personality type 328 and a mood intensity setting 336, the intersection of the two sets of behavioral movements 320 provides the set of movements 320 from which a behavioral movement 320 is selected. The selection can be made due to weightings or can be selected randomly.

The selected behavioral movement 320 is applied 1824 to the choreography sequence 1480 in the same manner as described above with gestures and natural language processing. The process is repeated for each hole, and a pass is made through the entire sequence 1480 again to ensure that filled holes are completely filled, and do not have any remainder holes. The finished choreography sequence 1480 is placed in a binary TCP/IP packet along with information as to who is speaking for transmission to the server 212.

Producing a listening choreography sequence is a subset of producing a choreography sequence 1480. Specifically, it may be viewed as filling a single large hole as described above. The listening sequence list is created just as the choreography sequence 1480 is, with only two nodes, the beginning and the end of the sequence (the duration of the first node being the total duration of the choreography sequence). The incoming choreography sequence 1480 is examined to determine the duration of the listening event. The listening sequence is completed as discussed above in filling holes, the only difference is that facial animation control is added as well as body control. In one embodiment, the listening sequences are generated for playback by each user's computer when a choreography sequence 1480 is generated and received. In contrast, a choreography sequence 1480 is produced on a first user's computer 108, and is then relayed to other users 100 through the serving computer as TCP/IP packet(s). However, in a preferred embodiment, as the listening movements are selected responsive to behavioral characteristics, the listening movements are also transmitted to other users 100 to provide other users 100 with behavioral information regarding the recipient 100(2).

Processing fidgets is similar to the processing of listening movements, as the personality data of the visual representation 232 is examined to determine which behavioral movements 320 are usable given the mood intensity value 336, and behavioral movements 320 are selected responsive to the weightings of the movements 320. In a preferred embodiment, the behavioral movements 320 or behavioral movement information are then sent to other users 100 to allow the other uses to learn about the user 100 through the behavioral fidgeting movements of the user's visual representation 232.

Once a choreography sequence 1480 has been generated or received, the sequence is played back by processing the nodes 1450 of the sequence 1480. Each node 1450 indicates which commands are to be issued when the node 1450 is processed, the text field 1454 contains which text (if any) is to be displayed, the animation fields 1458 for both facial and body control indicate which behavioral movements 320 are to be played and at what rate (including iteration information), and the event duration field indicates when the next node 1450 is to be processed. Thus, in accordance with the present invention, the choreography sequence 1480 is transmitted by a user 100(1) to a recipient 100(2) to communicate behavioral information over a remote network and thus provide a context within which the recipient 100(2) can interpret communicated data. Upon viewing the visual representation animated in accordance with the received choreography sequence 1480, the recipient 100(2) can interpret the communicated data in context, and thus a more complete communication is enabled for remote electronic exchanges.

What is claimed is:

1. A method of communicating data from a user to a remote recipient through a remote connection comprising:

providing a set of behavioral characteristics of a visual representation to the user, the behavioral characteristics representing contexts within which data is to be interpreted;

receiving a selection of a behavioral characteristic from one of the set of behavioral characteristics from the user;

receiving data to be communicated from the user to the recipient;

communicating the data to the recipient concurrently with a behavioral movement of the visual representation associated with the selected behavioral characteristic, wherein the behavioral movement provides context to the recipient for interpreting the communicated data;

receiving data from the user specifying a gesture for communicating behavioral information associated with a sequence of behavioral movements; and animating the visual representation responsive to the sequence of behavioral movements associated with the gesture.

2. The method of claim 1 wherein communicating the data to the recipient concurrently with a behavioral movement comprises animating the visual representation with the behavioral movement.

3. The method of claim 2 wherein the set of behavioral characteristics includes a set of personality types and mood intensity values, wherein each personality type comprises a set of behavioral movements and each mood intensity value comprises a set of behavioral movements, and animating the visual representation comprises:

responsive to a user selection of a personality type and mood intensity value, determining a set of behavioral movements comprising the intersection of the set of behavioral movements associated with the selected personality type and the set of behavioral movements associated with the selected mood intensity value;

and communicating the data to the recipient concurrently with a behavioral movement further comprises:

selecting a behavioral movement from the determined intersection set of behavioral movements; and animating the visual representation responsive to the selected behavioral movement.

4. The method of claim 3 further comprises randomly selecting a behavioral movement from the intersection set of behavioral movements.

5. The method of claim 1 wherein communicating the data to the recipient concurrently with a behavioral movement comprises animating movement of facial components of the visual representation.

6. The method of claim 1 wherein communicating the data to the recipient concurrently with a behavioral movement comprises animating movement of body components of the visual representation.

7. The method of claim 1 wherein communicating the data to the recipient concurrently with a behavioral movement comprises generating sound clips.

8. The method of claim 1 wherein the set of behavioral characteristics includes a set of personality types, and wherein a personality type comprises a predefined set of behavioral movements, and receiving a selection of a behavioral characteristic comprises receiving a selection of a personality type, and communicating the data to the recipient concurrently with a behavioral movement further comprises:

selecting a behavioral movement from the set of behavioral movements associated with the selected personality type; and animating the visual representation responsive to the selected behavioral movement.

9. The method of claim 8 wherein the behavioral movement is randomly selected from the set of behavioral movements associated with the selected personality type.

10. The method of claim 1 wherein the set of behavioral characteristics includes a set of mood intensity values, and receiving a selection of a behavioral characteristic further comprises receiving a selection of a mood intensity value, and selecting a behavioral movement from the set of behavioral movements further comprises selecting a behavioral movement from the set of behavioral movements responsive to the selected mood intensity value.

11. The method of claim 10 wherein a mood intensity value specifies a weight for each behavioral movement associated with a personality type, wherein the weight determines a probability of selecting the behavioral movement, and selecting a behavioral movement from the set of behavioral movements further comprises selecting a behavioral movement from the set of behavioral movements responsive to the weight associated with the behavioral movement.

12. The method of claim 10 in a system in which a second user selects at least one mood intensity value for a visual representation representing the second user, and selecting a behavioral movement from the set of behavioral movements further comprises selecting a behavioral movement from the set of behavioral movements responsive to the selected mood intensity value of the second user.

13. The method of claim 1 further comprising:

receiving an utterance override command comprising a subset of behavioral movements associated with a behavioral characteristic selected by the user; and selecting a behavioral movement within the set of behavioral movements associated with the received utterance override command; and wherein communicating the data to the recipient concurrently with a behavioral movement comprises:

animating the visual representation responsive to the utterance override command to communicate the selected behavioral characteristic.

14. The method of claim 13 wherein the utterance override command specifies a mood intensity setting.

15. The method of claim 1 wherein communicating the data to the recipient concurrently with a behavioral movement further comprises:

determining content of the data to be communicated; and modifying the behavioral movement of the visual representation responsive to the content of the data to be communicated.

16. The method of claim 15 in which predefined categories of words are associated with behavioral movements, and wherein determining the content of the data to be communicated comprises:

determining whether words in the data to be communicated belong to a predefined category; and wherein modifying further comprises:

responsive to determining that a word in the data to be communicated belongs to a predefined category animating the visual representation responsive to the behavioral movement associated with the category.

17. The method of claim 15 wherein predefined phrases are associated with at least one behavioral movement, and determining the content further comprises:

determining whether at least one predefined phrase is part of the data to be communicated; and responsive to determining that a predefined phrase is part of the data to be communicated, animating the visual representation responsive to the at least one behavioral movement associated with the predefined phase.

18. A method of communicating data from a user to a remote recipient through a remote connection comprising:

providing a set of behavioral characteristics of a visual representation to the user, the behavioral characteristics representing contexts within which data is to be interpreted;

receiving a selection of a behavioral characteristic from one of the set of behavioral characteristics from the user;

receiving data to be communicated from the user to the recipient;

communicating the data to the recipient concurrently with a behavioral movement of the visual representation associated with the selected behavioral characteristic, wherein the behavioral movement provides context to the recipient for interpreting the communicated data;

receiving an utterance override command comprising a subset of behavioral movements associated with a behavioral characteristic selected by the user; and selecting a behavioral movement within the set of behavioral movements associated with the received utterance override command;

wherein communicating the data to the recipient concurrently with a behavioral movement comprises:

animating the visual representation responsive to the utterance override command to communicate the selected behavioral characteristic; and wherein the utterance override command specifies a personality type.

19. A method of communicating over a network comprising:

receiving a data communication from a first user, wherein the data communication contains behavioral movement information;

translating the received behavioral movement information into a choreography sequence of behavioral movements of a figure of the first user by:

determining whether the data communication contains gesture commands; and responsive to determining that the data communication contains at least one gesture command, constructing a choreography sequence from at least one behavioral movement associated with the at least one gesture command; and animating the figure responsive to the choreography sequence.

20. The method of claim 19 in a system in which the received data communication is sent by a user, and at least one personality type is provided to the user for selection, wherein translating further comprises:

determining whether a personality type has been selected by the user; and responsive to determining that a personality type has been selected by the user, constructing the choreography sequence using at least one behavioral movement associated with the selected personality type.

21. The method of claim 20 in which the received data communication is sent by a user, and a mood intensity setting is provided to the user for selecting a mood intensity value, and translating further comprises:

determining the mood intensity value selected by the user; and constructing the choreography sequence using at least one behavioral movement associated with the selected personality type, and selected responsive to the mood intensity value.

22. A method of communicating over a network comprising:

receiving a data communication from a first user, wherein the data communication contains behavioral movement information;

translating the received behavioral movement information into a choreography sequence of behavioral movements of a figure of the first user by:

responsive to the data communication containing text, processing the text in accordance with at least one natural language processing rule; and constructing a choreography sequence from at least one behavioral movement associated with the at least one natural language processing rule; and animating the figure responsive to the choreography sequence.

23. The method of claim 22 wherein translating further comprises:

responsive to the data communication containing at least one predefined phrase, constructing a choreography sequence from at least one natural language processing rule associated with the at least one predefined phrase.

24. A method of providing a visual interface for a remote connection in a network, comprising:

generating behavioral movement information to animate a figure representing a first user in accordance with a selected behavioral characteristic by the first user responsive to receiving no communication from the first user or other users of the network;

transmitting the generated behavioral movement information to the other users of the network;

displaying the figure representing the first user;

animating the figure representing the first user responsive to the generated behavioral movement information;

responsive to receiving a data string from the first user, stopping animation of the figure representing the first user; and transmitting behavioral movement information for the, figure to the other users in the network responsive to the data string received from the first user.

25. The method of claim 24 further comprising providing a visual interface for a remote connection, comprising:

responsive to receiving a communication from a second user of the network, stopping the animation of the figure representing the first user;

generating behavioral movement information to animate the figure representing the first user in accordance with a selected behavioral characteristic by the first user responsive to the communication received from the second user of the network; and transmitting the generated behavioral movement information to the other users of the network.

26. A method of providing a visual interface for a remote connection between the first and second user, comprising:

receiving a communication from a first user;

constructing a choreography sequence of behavioral movements for a figure representative of the second user responsive to behavioral characteristics selected by the second user, a gesture command provided by the second user, and the communication received from the first user; and transmitting the choreography sequence to the first user.

27. The method of claim 26 further comprising:

selecting a behavioral movement from a set of behavioral movements associated with receiving communication responsive to the selected behavioral characteristic.

28. The method of claim 26 wherein animating further comprises:

parsing the communication received from the first user for a choreography sequence; and animating the figure of the second user responsive to the received choreography sequence received from the first user.

29. A method for enabling a user to communicate remotely through a network comprising:

receiving behavioral information from a user;

receiving gesture data from the user specifying a gesture for communicating behavioral information associated with a sequence of behavioral movements;

receiving a data string from the user;

parsing the data string for a text string;

generating behavioral movement information from the received behavioral information and the gesture data;

animating a figure responsive to the generated behavioral movement information; and displaying the text string responsive to the behavioral information.

30. The method of claim 29 wherein displaying the text string further comprises:

displaying the text string having visual characteristics responsive to the behavioral information received from the user.

31. The method of claim 29 wherein displaying the text string further comprises:

displaying the text string in a text size responsive to behavioral information received from the user.

32. The method of claim 29 wherein displaying the text string further comprises:

displaying the text string at a rate of speed responsive to behavioral information received from the user.

33. The method of claim 29 wherein displaying the text string further comprises:

displaying subsequent text strings received at a rate of speed responsive to behavioral information received from the user.

34. The method of claim 29 further comprising the steps of determining content of the received text string;

determining behavioral movement information from the content of the received text string; and animating the visual representation responsive to the determined behavioral movement information.

35. A computer readable medium for storing instructions to cause a processor to communicate data from a user to a remote recipient through a remote connection, the instructions causing the processor to:

provide a set of behavioral characteristics of a visual representation to the user, the behavioral characteristics representing contexts within which data is to be interpreted;

receive a selection of a behavioral characteristic from one of the set of behavioral characteristics from the user;

receive data to be communicated from the user; and communicate the data to the recipient concurrently with a behavioral movement of the visual representation associated with the selected behavioral characteristic, wherein the behavioral movement provides context to the recipient for interpreting the communicated data;

wherein at least one gesture for communicating behavioral information is associated with a sequence of behavioral movements the instructions further causing the processor to:

receive data from the user specifying a gesture; and animate the visual representation responsive to a sequence of behavioral movements associated with the gesture.

36. The computer readable medium of claim 35 wherein the instructions to cause the processor to communicate the data to the recipient concurrently with a behavioral movement comprise instructions to cause the processor to animate the visual representation.

37. The computer readable medium of claim 35 wherein the set of behavioral characteristics includes a set of personality types, and wherein a personality type comprises a predefined set of behavioral movements, and the instructions to cause the processor to communicate the data to the recipient concurrently with a behavioral movement further comprise instructions to cause the processor to:

select a behavioral movement from the set of behavioral movements associated with the selected personality type; and animate the figure responsive to the selected behavioral movement.

38. The computer readable medium of claim 37 wherein a mood intensity value specifies a weight for each behavioral movement associated with a personality type, wherein the weight determines a probability of selecting the behavioral movement, and the instructions causing a processor to select a behavioral movement from the set of behavioral movements further comprise instructions to causing a processor to select a behavioral movement from the set of behavioral movements responsive to the weight associated with the behavioral movement.

39. The computer readable medium of claim 35 wherein the set of behavioral characteristics includes a set of mood intensity values, and the computer readable medium further causes the processor to receive a user selection of a mood intensity value, and the instructions causing a processor to select a behavioral movement from the set of behavioral movements further comprise instructions to cause a processor to select a behavioral movement from the set of behavioral movements responsive to the selected mood intensity value.

40. The computer readable medium of claim 35 in which an utterance override command comprises a subset of behavioral movements associated with a behavioral characteristic selected by the user, the instructions further causing the processor to:

receive an utterance override command; and select a behavioral movement within the set of behavioral movements associated with the received utterance override command; and communicating the data to the recipient concurrently with a behavioral movement comprises:

animate the figure responsive to the utterance override command to communicate the selected behavioral characteristic.

41. The computer readable medium of claim 35 wherein the instructions causing the processor to communicate the data to the recipient concurrently with a behavioral movement further comprises instructions to cause the processor to:

determine content of the data to be communicated; and modify the behavioral movement of the visual representation responsive to the content of the data to be communicated.

42. The computer readable medium of claim 35 in a system wherein the instructions causing the processor to determine the content of the data to be communicated comprise:

determine whether words in the data to be communicated belong to a predefined category, and the instructions causing the processor to modify the behavioral movement further comprise instructions to cause the processor to:

responsive to the processor determining that a word in the data to be communicated belongs to a predefined category, animate the visual representation responsive to the behavioral movement associated with the predefined category.

43. The computer readable medium of claim 42 wherein the categories include referents, ejaculations, volumetrics, and prepositions.

44. The computer readable medium of claim 42 wherein the categories include egocentrics, and xenocentrics.

45. The computer readable medium of claim 42 wherein the categories include negatives and positives.

46. The computer readable medium of claim 42 wherein the instructions causing the processor to modify the behavioral movement of the visual representation further cause the processor to modify the behavioral movement of the visual representation in response to a weighting associated with the behavioral movement associated with the predefined category.

47. A user interface for selecting a behavioral movement to be performed by a visual representation of a user to communicate behavioral information to a remote user, the user interface comprising:

an inner geometric figure, the inner geometric figure divided into sections, each section designating a class of behavior; and an outer geometric figure concentric with the inner geometric figure, divided into sections, and responsive to a pointing device being moved from a section of the inner geometric figure into the outer geometric figure, each section displaying a behavioral movement associated with the class of behavior designated by the section of the inner geometric figure from which the pointing device moved.

48. A method of communicating data containing text from a user to a remote recipient through a remote connection in which predefined categories of text are associated with behavioral movements, comprising:

providing a set of behavioral characteristics of a visual representation to the user, the behavioral characteristics representing contexts within which data is to be interpreted;

receiving a selection of a behavioral characteristic from one of the set of behavioral characteristics from the user;

receiving text to be communicated from the user to the recipient;

determining whether a word in the text to be communicated belongs to a predefined category, and responsive to determining that a word in the data to be communicated belongs to a predefined category, communicating the text to the recipient concurrently with a behavioral movement of the visual representation associated with the predefined category and responsive to the selected behavioral characteristic, wherein the behavioral movement provides context to the recipient for interpreting the communicated text.

49. The method of claim 48 wherein the predefined categories include referents, ejaculations, volumetrics, and prepositions.

50. The method of claim 48 wherein the predefined categories include egocentrics and xenocentrics.

51. The method of claim 48 wherein the predefined categories include negatives and positives.

52. A method of communicating data from a user to a remote recipient through a remote connection comprising:

providing a set of behavioral characteristics of a visual representation to the user, the behavioral characteristics representing contexts within which data is to be interpreted;

receiving a selection of a behavioral characteristic from one of the set of behavioral characteristics from the user;

receiving gesture data from the user specifying a gesture for communicating behavioral information associated with a sequence of behavioral movements;

receiving data to be communicated from the user to the recipient; and communicating the data to the recipient concurrently with a sequence of behavioral movements of the visual representation associated with the selected behavioral characteristic and the gesture data, wherein the sequence of behavioral movements provide context to the recipient for interpreting the communicated data.

53. The method of claim 52, further comprising animating the visual representation responsive to the sequence of behavioral movements associated with the selected behavioral characteristic and the gesture data.

54. A computer readable medium for storing instructions to cause a processor to communicate data from a user to a remote recipient through a remote connection, the instructions causing the processor to:

provide a set of behavioral characteristics of a visual representation to the user, the behavioral characteristics representing contexts within which data is to be interpreted;

receive a selection of a behavioral characteristic from one of the set of behavioral characteristics from the user;

receive gesture data from the user specifying a gesture for communicating behavioral information associated with a sequence of behavioral movements;

receive data to be communicated from the user; and communicate the data to the recipient concurrently with a sequence of behavioral movements of the visual representation associated with the selected behavioral characteristic and the gesture data, wherein the sequence of behavioral movements provide context to the recipient for interpreting the communicated data.

55. The computer readable medium of claim 54, further comprising instructions to animate the visual representation responsive to the sequence of behavioral movements associated with the selected behavioral characteristic and the gesture data.

56. A method of communicating data containing text from a user to a remote recipient through a remote connection in which predefined categories of text are associated with behavioral movements, comprising:

providing a set of behavioral characteristics of a visual representation to the user, the behavioral characteristics representing contexts within which data is to be interpreted;

receiving a selection of a behavioral characteristic from one of the set of behavioral characteristics from the user;

receiving a gesture command from the user;

receiving text to be communicated from the user to the recipient;

determining whether a word in the text to be communicated belongs to a predefined category, and responsive to determining that a word in the data to be communicated belongs to a predefined category, communicating the text to the recipient concurrently with a behavioral movement of the visual representation associated with the predefined category and responsive to the selected behavioral characteristic and the gesture command, wherein the behavioral movement provides context to the recipient for interpreting the communicated text.

* * * * *